(12) United States Patent
Hirose et al.

(10) Patent No.: US 7,597,340 B2
(45) Date of Patent: Oct. 6, 2009

(54) ENGINE-DRIVEN WORK MACHINE

(75) Inventors: Tadafumi Hirose, Saitama (JP); Shuhei Imai, Saitama (JP); Takao Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 10/562,216

(22) PCT Filed: Jul. 8, 2004

(86) PCT No.: PCT/JP2004/009715

§ 371 (c)(1),
(2), (4) Date: Mar. 28, 2007

(87) PCT Pub. No.: WO2005/005225

PCT Pub. Date: Jan. 20, 2005

(65) Prior Publication Data

US 2007/0176426 A1 Aug. 2, 2007

(30) Foreign Application Priority Data

Jul. 10, 2003 (JP) ............................. 2003-273024
Jul. 10, 2003 (JP) ............................. 2003-273025

(51) Int. Cl.
*B62B 1/20* (2006.01)

(52) U.S. Cl. ............................. 280/655.1; 280/47.315; 16/110.1

(58) Field of Classification Search .............. 280/665.1, 280/47.315, 47.36, 47.371; 16/110.1, 421, 16/422, 425, 429
See application file for complete search history.

(56) References Cited

U.S. PATENT DOCUMENTS

| D277,954 S | * | 3/1985 | Mizushima ................ D13/114 |
| 5,441,297 A | * | 8/1995 | Krohn et al. ................ 280/655 |
| 5,924,393 A | * | 7/1999 | Kikuchi ........................ 123/2 |
| 6,299,195 B1 | * | 10/2001 | Chan .......................... 280/651 |
| 6,541,718 B2 | * | 4/2003 | Burkholder et al. ...... 200/50.28 |
| 6,742,995 B1 | * | 6/2004 | Wood et al. ................. 417/234 |
| 6,758,169 B2 | * | 7/2004 | Suzuki et al. .................. 123/3 |

(Continued)

FOREIGN PATENT DOCUMENTS

EP 1 265 340 A2 12/2002

(Continued)

*Primary Examiner*—Christopher P Ellis
*Assistant Examiner*—John D Walters
(74) *Attorney, Agent, or Firm*—Arent Fox LLP

(57) ABSTRACT

An engine-driven work machine equipped with a moving handle is provided wherein the moving handle (86) is formed from a pair of left and right handle bars (88, 88) having a handle grip (93) at the extremity, and a cross member (89) integrally connecting middle parts of the handle bars (88, 88) to each other, and the two handle bars (88, 88) are mounted in upper parts of left and right side frames (2b, 2b) of a frame (2) so that the two handle bars (88, 88) can pivot between a working position (A) in which the two handle bars (88, 88) protrude from the frame (2) and a storage position (B) in which, with the handle grip (93) facing downward, the handle bars (88, 88) in cooperation with the cross member (89) function as a bumper. When the moving handle is not used, it can be folded compactly, and equipment on the frame can thereby be protected from contact with another object by utilizing the handle.

15 Claims, 20 Drawing Sheets

U.S. PATENT DOCUMENTS 7,224,578 B2 * 5/2007 Buck et al. .................. 361/625

FOREIGN PATENT DOCUMENTS

| | | |
|---|---|---|
| JP | 57-179569 | 11/1982 |
| JP | 2-87935 | 7/1990 |
| JP | 2-121478 | 10/1990 |
| JP | 6-49259 U | 7/1994 |
| JP | 09-019509 A | 1/1997 |
| JP | 10-89083 A | 4/1998 |
| JP | 11-321658 A | 11/1999 |

* cited by examiner

ENGINE-DRIVEN WORK MACHINE

CROSS-REFERENCE TO RELATED APPLICATION

This application is a National Stage entry of International Application No. PCT/JP2004/009715, filed Jul. 8, 2004, the entire specification claims and drawing of which are incorporated herewith by reference.

TECHNICAL FIELD

The present invention relates to an improvement of an engine-driven work machine that includes a frame formed from a base frame and a pair of left and right side frames sharing left and right side sections of the base frame, a wheel axially supported on the base frame so that it can rotate in the fore-and-aft direction of the frame, equipment, including an engine and a work machine driven thereby, supported on the base frame, and a moving handle provided on an end part in the fore-and-aft direction of the frame, transport of the engine-driven work machine by rolling the wheel as a result of pushing or pulling of the moving handle being made easy.

BACKGROUND ART

Such an engine-driven work machine is already known as disclosed, for example, in Publication 1 below.
Patent Publication 1: Japanese Patent Application Laid-open No. 10-89083

DISCLOSURE OF THE INVENTION

Problems to be Solved by the Invention

In the engine-driven work machine disclosed in Publication 1 above, since the moving handle is provided so as to be connected integrally to the frame and always protrudes from the frame, there are the problems that when the work machine is being used, the handle interferes with work, and when it is stored in a warehouse, etc., it is necessary due to the handle to ensure that there is a large storage space.

The present invention has been accomplished under the above-mentioned circumstances, and it is an object thereof to provide an engine-driven work machine in which, when a moving handle is not used, it can be folded compactly, thus allowing work to be easily carried out without being disturbed by the handle and making it possible for it to be stored in a relatively small storage space and, moreover, equipment on the frame can be protected from contact with another object by utilizing the handle.

Means of Solving the Problems

To attain the above object, according to a first aspect of the present invention, there is provided an engine-driven work machine comprising a frame formed from a base frame and a pair of left and right side frames sharing left and right side sections of the base frame, a wheel axially supported on the base frame so that the wheel can rotate in the fore-and-aft direction of the frame, equipment, including an engine and a work machine driven thereby, supported on the base frame, and a moving handle provided on an end part in the fore-and-aft direction of the frame, characterized in that the moving handle is formed from a pair of left and right handle bars having a handle grip at the extremity, and a cross member integrally connecting middle parts of the handle bars to each other, and the two handle bars are mounted in upper parts of the side frames so that the two handle bars can pivot between a working position in which the two handle bars protrude from the frame and a storage position in which, with the handle grip facing downward, the handle bars in cooperation with the cross member function as a bumper.

According to a second aspect of the present invention, in addition to the first aspect, when the moving handle is in the storage position, an end part of the base frame protruding outward relative to the equipment abuts against the handle bars.

According to a third aspect of the present invention, in addition to either the first or second aspect, an electrical component for the engine and the work machine is mounted on the frame so that the electrical component is protected by the moving handle in the storage position.

According to a fourth aspect of the present invention, in addition to the second aspect, a control box is mounted on the base frame and end parts, in the fore-and-aft direction, of the two side frames so that the control box is protected by the moving handle in the storage position, the control box housing and holding an electrical component for the engine and the work machine.

According to a fifth aspect of the present invention, in addition to the first aspect, the moving handle is mounted on a handle bracket fixedly provided on an upper part of the frame so that the handle can pivot between a working position in which the handle protrudes from the frame and a storage position in which the handle grip faces downward, and a lock mechanism is provided between the handle bracket and the moving handle, the lock mechanism automatically locking the handle at the working position when the handle is pivoted to the working position.

According to a sixth aspect of the present invention, in addition to the fifth aspect, the lock mechanism comprises an operating lever axially supported on the moving handle so as to pivot between a locked position and an unlocked position, a latching member provided on the operating lever, a latching groove provided on the handle bracket, the latching member engaging with and disengaging from the latching groove accompanying the operating lever pivoting to the locked position and the unlocked position, and a lock spring urging the operating lever in the locked position direction.

According to a seventh aspect of the present invention, in addition to either the fifth or sixth aspect, a damper is provided between the handle bracket and the moving handle, the damper having a cushion member that undergoes elastic deformation between a point immediately before the handle reaches the working position and a point when the handle reaches the working position.

According to an eighth aspect of the present invention, in addition to the seventh aspect, the damper is formed from the cushion member, which is mounted on one of the handle bracket and the moving handle, and a bush fitted around the outer periphery of the cushion member, the bush being pressed by the other one of the handle bracket and the moving handle to thus elastically deform the cushion member between a point immediately before the moving handle reaches the working position and a point when the handle reaches the working position.

Effect of the Invention

In accordance with the first aspect of the present invention, when the moving handle is not used, it can be pivoted to the storage position and folded compactly, and it is therefore possible to easily carry out work using the engine-driven work machine without being disturbed by the handle. Furthermore, when the engine-driven work machine is stored in a warehouse, etc., it requires only a relatively small storage space and, moreover, since the handle functions as a bumper, the equipment on the frame can be protected from contact with another object without providing a bumper exclusively used for this purpose.

Furthermore, in accordance with the second aspect of the present invention, the moving handle pivoted to the storage position can form, in cooperation with the frame, a strong bumper, thus strongly protecting the equipment on the frame.

Moreover, in accordance with the third aspect of the present invention, the moving handle pivoted to the storage position can protect the electrical component from contact with another object.

Moreover, in accordance with the fourth aspect of the present invention, the control box, which is relatively large and houses the electrical component, can be protected effectively by the moving handle pivoted to the storage position and the base frame of the frame without providing a special guard frame, and a control box main body, which is large, can therefore be made of a synthetic resin, thus reducing the weight thereof.

Moreover, in accordance with the fifth aspect of the present invention, when the moving handle is not used, it can be pivoted to the storage position and folded compactly, work using the work machine can therefore be carried out easily without being disturbed by the handle and, moreover, when the work machine is stored in a warehouse, etc., it requires only a relatively small storage space.

Furthermore, since the moving handle is locked at the working position by the automatic lock mechanism when the handle is pivoted to the working position, even if a hand is detached from the handle when it is used, it is possible to prevent the handle from pivoting to the storage position due to its own weight, thus achieving a good operability for the handle.

Moreover, in accordance with the sixth aspect of the present invention, when the moving handle is pivoted to the working position, the handle can be automatically and reliably locked at the working position and, furthermore, a simple operation of pivoting the operating lever to the unlocked position enables the handle to be released from the locked state and pivoted to the storage position.

Furthermore, in accordance with the seventh aspect of the present invention, a shock caused by pivoting the moving handle to the working position can be absorbed by elastic deformation of the cushion member of the damper and, moreover, when the handle is at the working position, the resilient force of the cushion member acts on the lock mechanism, thus preventing the lock mechanism from rattling.

Moreover, in accordance with the eighth aspect of the present invention, when the damper functions, the bush abuts against the other one of the handle bracket and the moving handle and is pressed thereby, and it is therefore possible to prevent the cushion member from making direct contact with the other one of the handle bracket and the moving handle, thus enhancing the durability of the cushion member.

The work machine corresponds to a generator 4 of an embodiment of the present invention, which will be described later, and the engine-driven work machine corresponds to the engine-driven generator 1. Furthermore, the electrical component corresponds to a control unit 53 and an inverter 55 of the embodiment, the control box corresponds to an intake box 34 of the embodiment, and the latching member corresponds to a latching pin 105 of the embodiment.

The above-mentioned object, other objects, characteristics, and advantages of the present invention will become apparent from an explanation of a preferred embodiment that will be described in detail below by reference to the attached drawings.

EXPLANATION OF REFERENCE NUMERALS AND SYMBOLS

1 Engine-Driven Work Machine (Engine-Driven Generator)
2 Frame
2*a* Base Frame
2*b* Side Frame
3 Engine
4 Work Machine (Generator)
34 Control Box (Intake Box)
53 Electrical Component (Control Unit)
55 Electrical Component (Inverter)
83 Wheel
86 Moving Handle
88 Handle Bar
87 Handle Bracket
89 Cross Member
93 Handle Grip
97 Damper
99 Cushion Member
100 Bush
101 Lock Mechanism
103 Operating Lever
105 Latching Member (Latching Pin)
106 Latching Groove
107 Lock Spring
A Working Position of Moving Handle
B Storage Position of Moving Handle
L Locked Position
U Unlocked Position

BEST MODE FOR CARRYING OUT THE INVENTION

A preferred embodiment of the present invention is explained below by reference to the attached drawings.

EMBODIMENT 1

Figure 1:
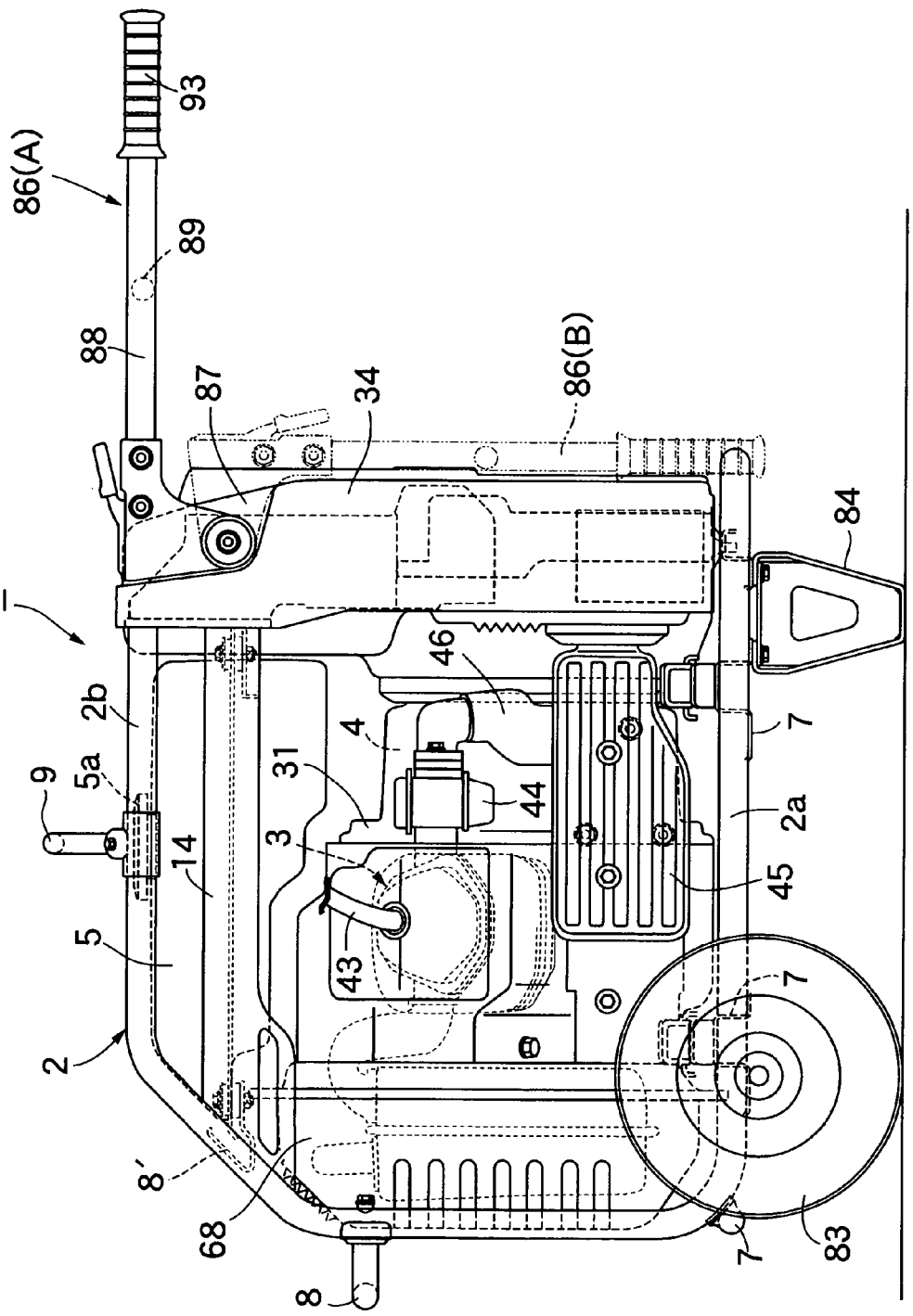
FIG. 1 is a side view of an engine-driven generator related to the present invention, showing a moving handle in a working state.
Figure 2:
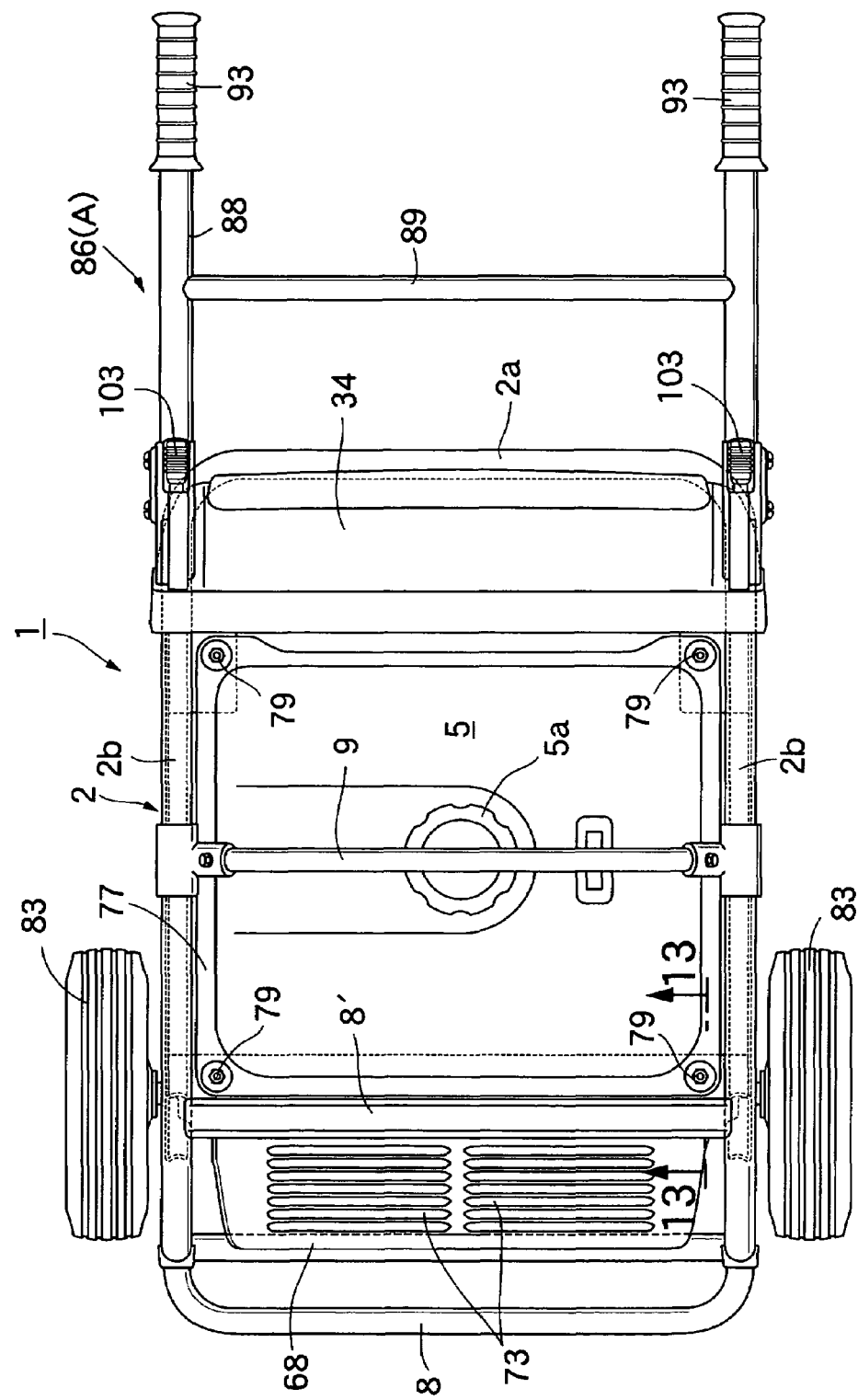
FIG. 2 is a plan view of the engine-driven generator.
Figure 3:
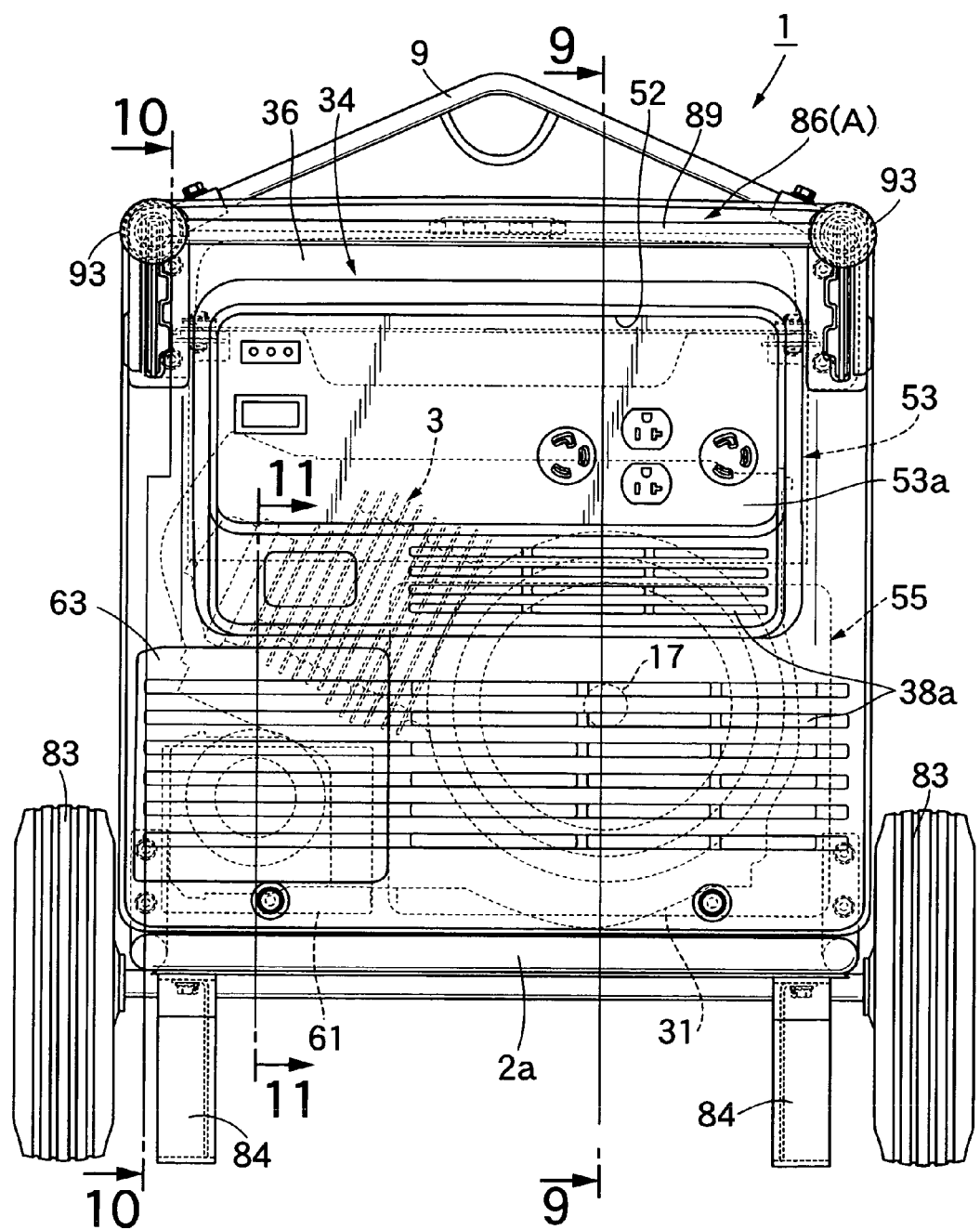
FIG. 3 is a front view of the engine-driven generator.
Figure 4:
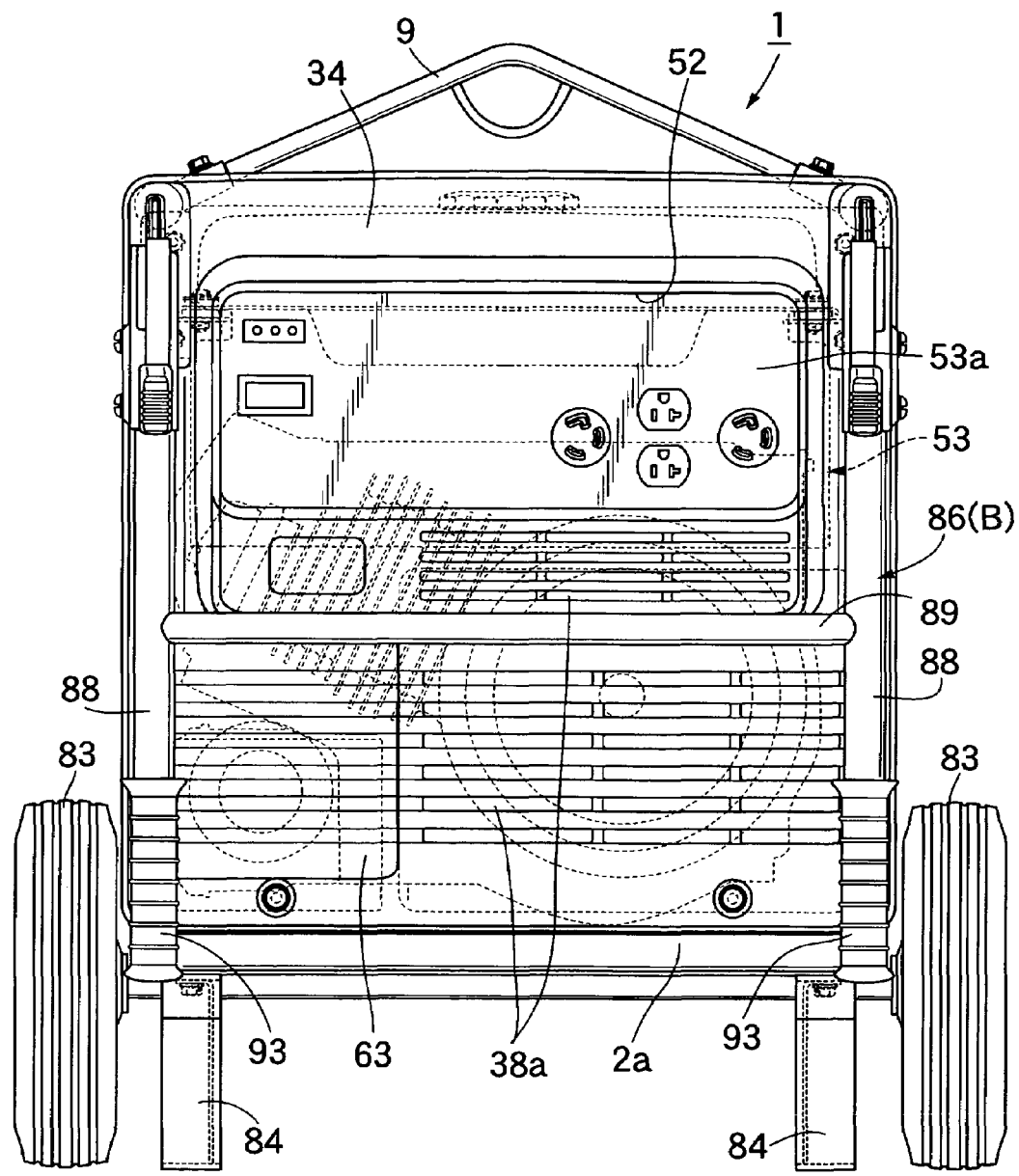
FIG. 4 is a front view of the engine-driven generator when the moving handle is in a stored state.

Referring firstly to FIG. 1 to FIG. 3, an engine-driven generator 1 of the present invention includes a frame 2, an engine 3 and a generator 4 that are resiliently supported on a lower part of the frame 2, a fuel tank 5 that is mounted on an upper part of the frame 2, and a control unit 53 for the engine 3 and the generator 4.

As shown in FIG. 1 to FIG. 3 and FIG. 8, the frame 2 is formed from a base frame 2a formed by bending a steel pipe into a U-shape, and left and right side frames 2b formed by bending steel pipes connected to opposite ends of the base frame 2a first upward and then horizontally, the side frames 2b forming, in cooperation with left and right side sections of the base frame 2a, a U-shape.

Provided on the base frame 2a are a plurality of lower cross members 7 providing a connection between the left and right side sections, provided between upper parts of vertical side sections of the side frames 2b is a middle cross member 8 providing a connection between the upper parts, and provided between inclined upper corners of the side frames 2b is an upper cross member 8' providing a connection between the corners. This middle cross member 8 has a longitudinally middle section projecting outward relative to the side frames 2b so as to function also as a bumper. Provided in upper side sections of the left and right side frames 2b is a hanger member 9 for providing a connection between middle parts of the upper side sections, the hanger member 9 being used for hanging and moving the engine-driven generator 1. In this way, the frame 2 is formed in the shape of a framework having an open periphery.

In the engine-driven generator 1, the side on which the U-shaped side frames 2b are open is defined as the front side, and the side on which the side frames 2b are closed, that is, the middle cross member 8 side, is defined as the rear side.

Figure 6:
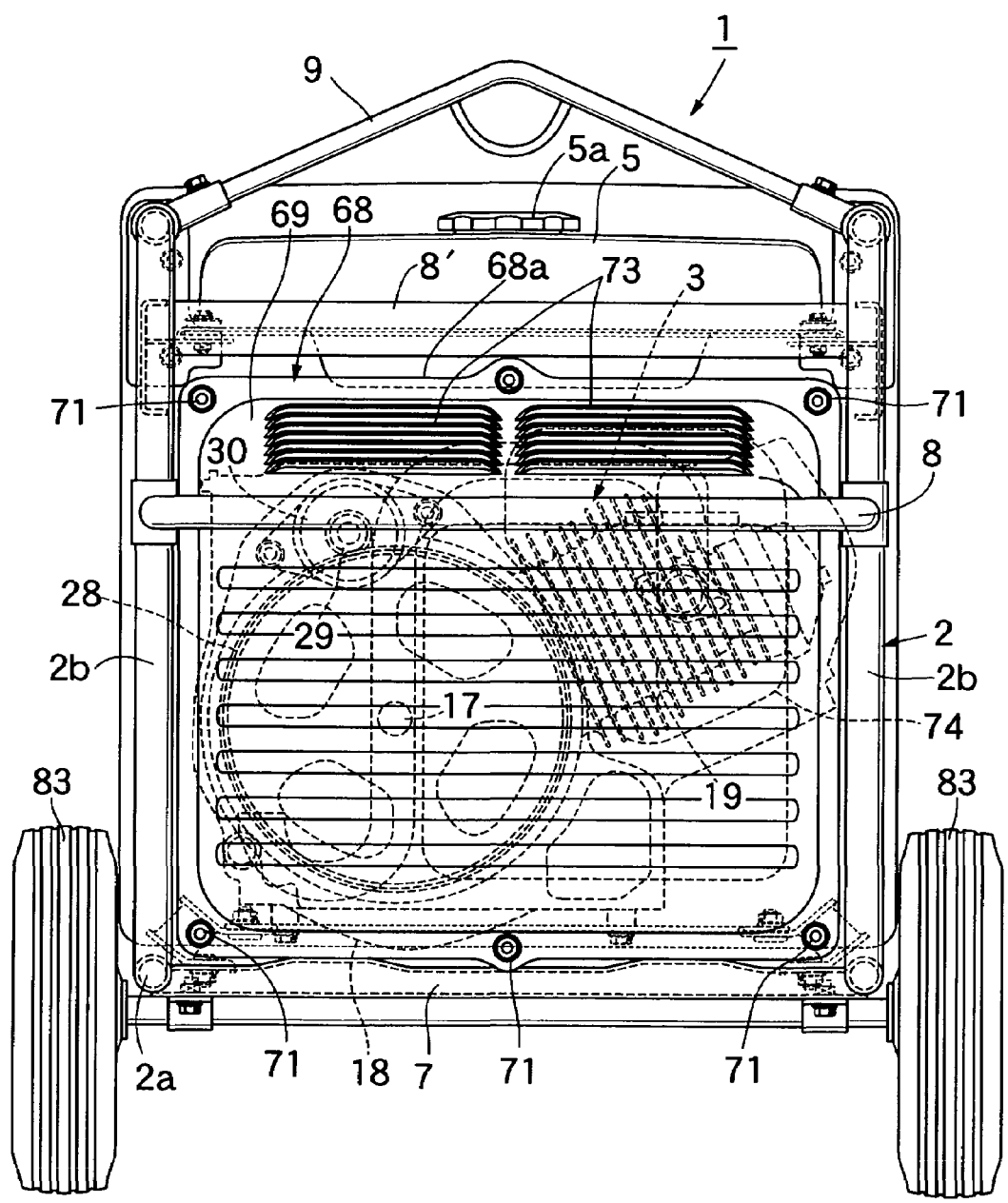
FIG. 6 is a rear view of the engine-driven generator.
Figure 7:
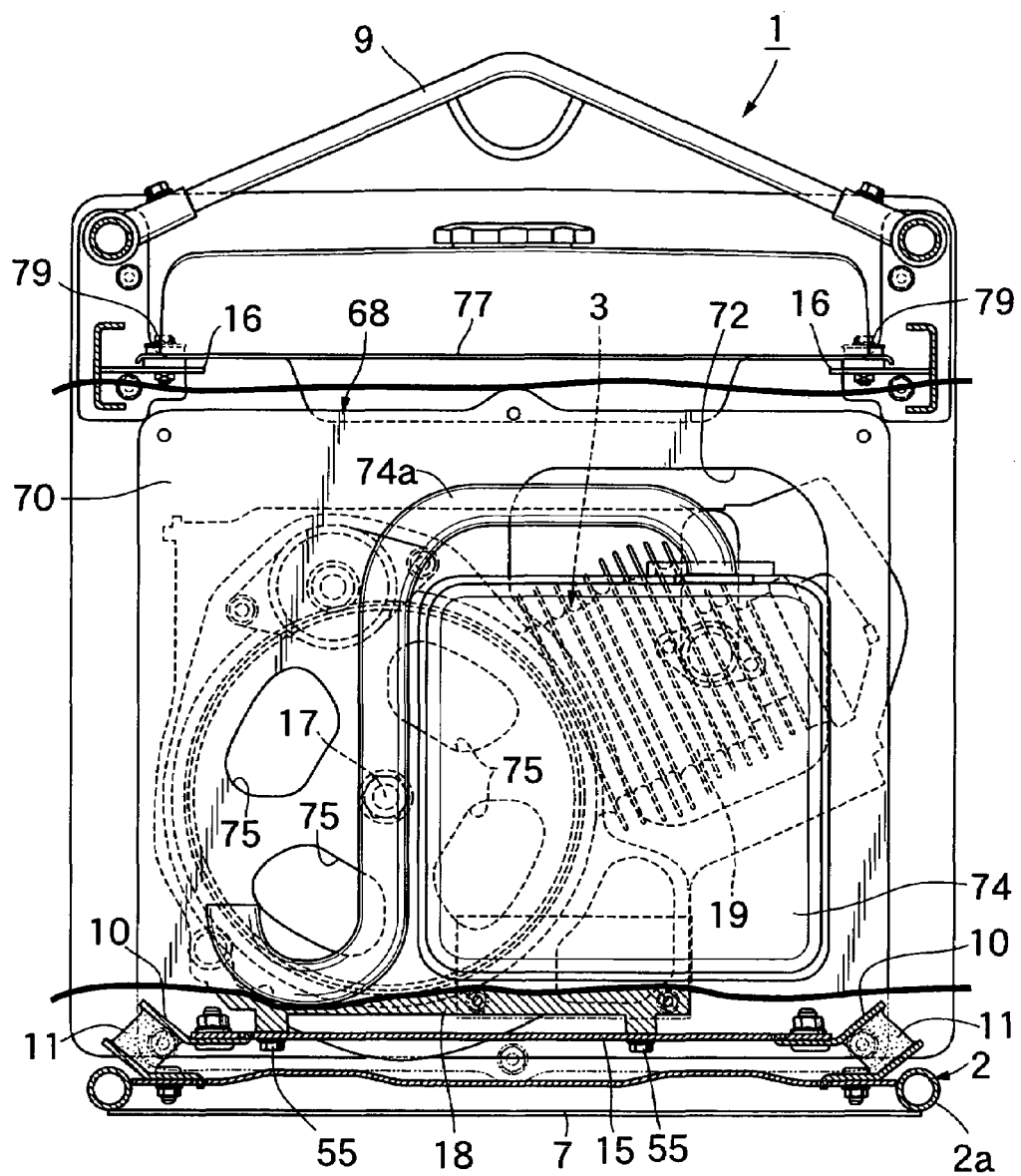
FIG. 7 is a rear view of the engine-driven generator, showing an exhaust box, part thereof being cut away.
Figure 8:
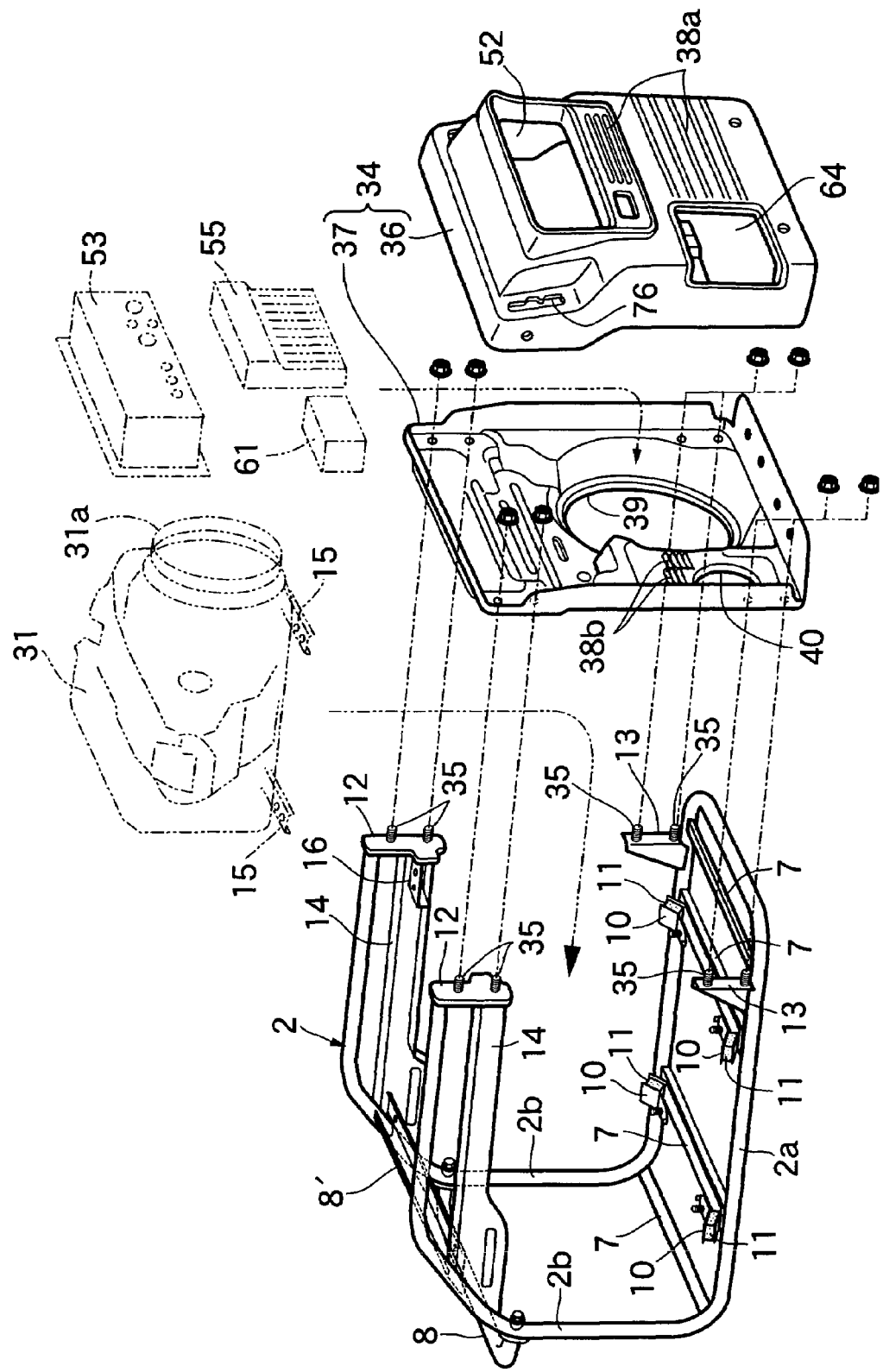
FIG. 8 is an exploded perspective view of part of the engine-driven generator.

In FIG. 6 to FIG. 8, among the lower cross members 7, two of the cross members 7 are equipped, via elastic members 11, with front and rear pairs of left and right support plates 10. Furthermore, provided on the left and right side frames 2b are upper and lower pairs of left and right brackets 12 and 13 disposed vertically on the front side of the frame 2, and connected to lower parts of the upper brackets 12 are reinforcing stays 14 extending forward from an upper end part of the vertical side section of the corresponding side frame 2b. Provided at front end parts of these reinforcing stays 14 are a pair of left and right bracket pieces 16.

Joined by bolts to the pairs of left and right support plates 10 are connecting plates 15 that provide a connection therebetween, and joined by a bolt 33 to these connecting plates 15 is a bottom wall of the engine 3 or a bottom wall of a duct member 31, which will be described later, joined to the engine 3. In this way, an assembly of the engine 3 and the generator 4 is resiliently supported on the frame 2.

Figure 9:
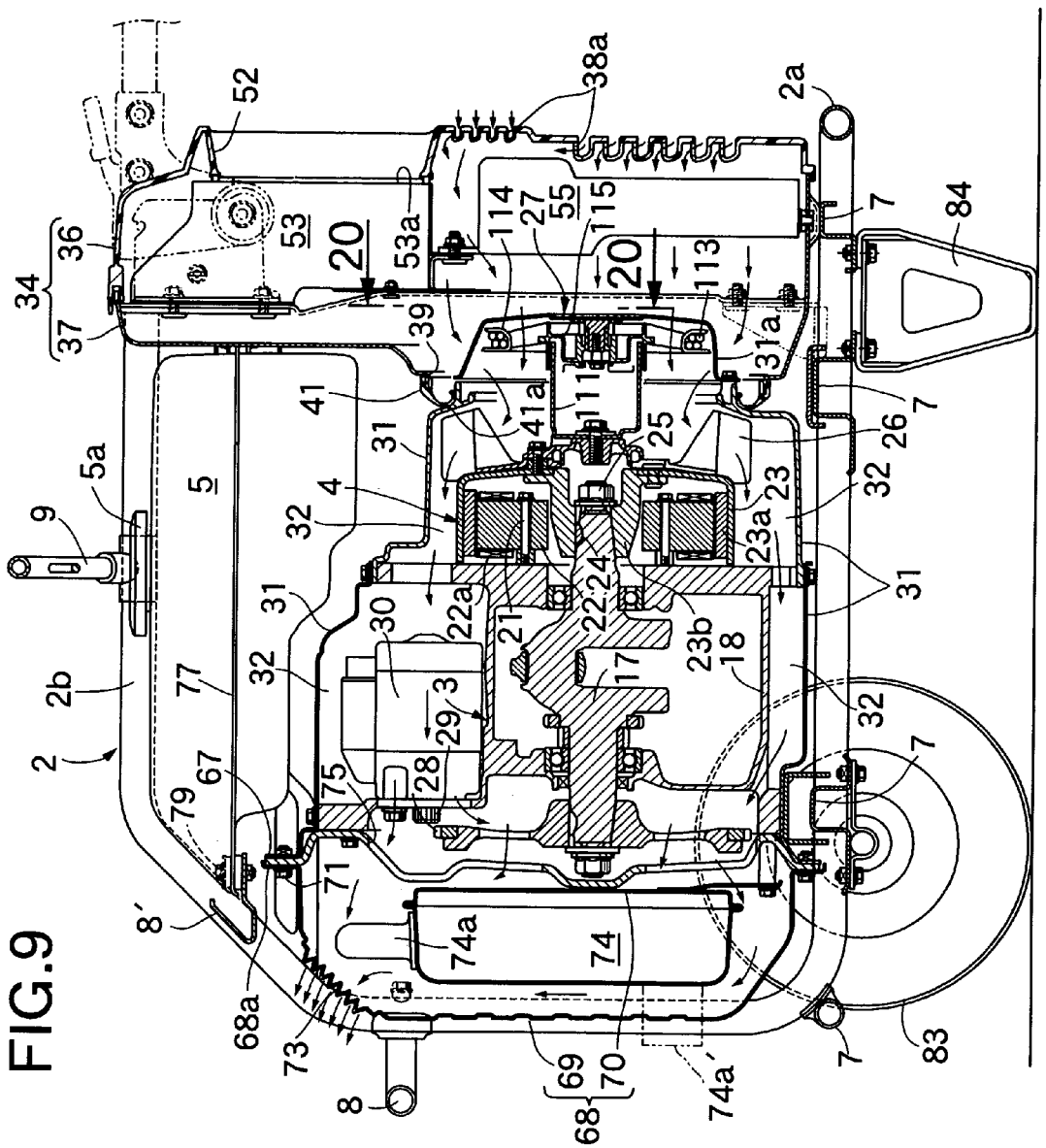
FIG. 9 is a sectional view along line 9-9 in FIG. 3.
Figure 10:
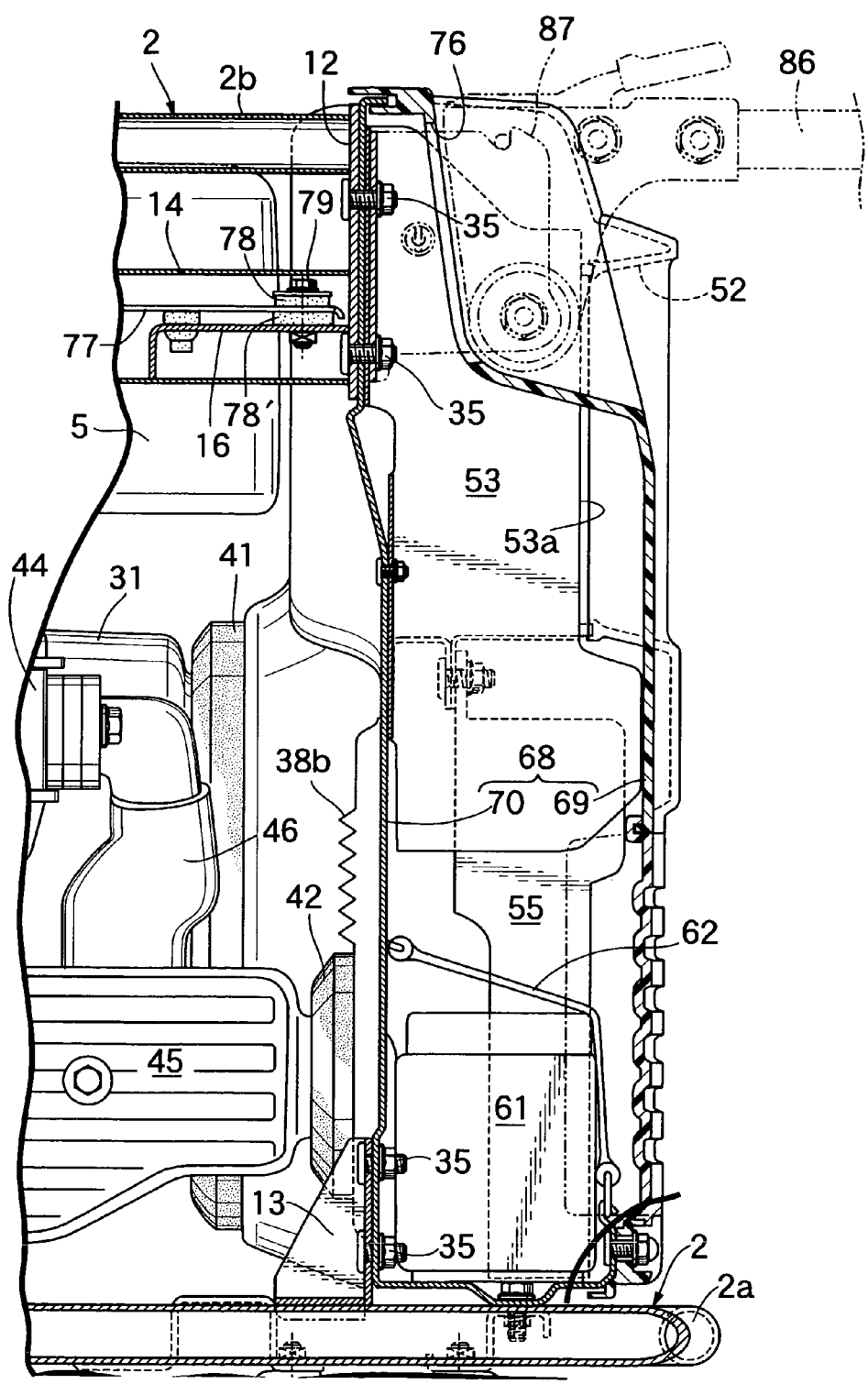
FIG. 10 is a sectional view along line 10-10 in FIG. 3.
Figure 11:
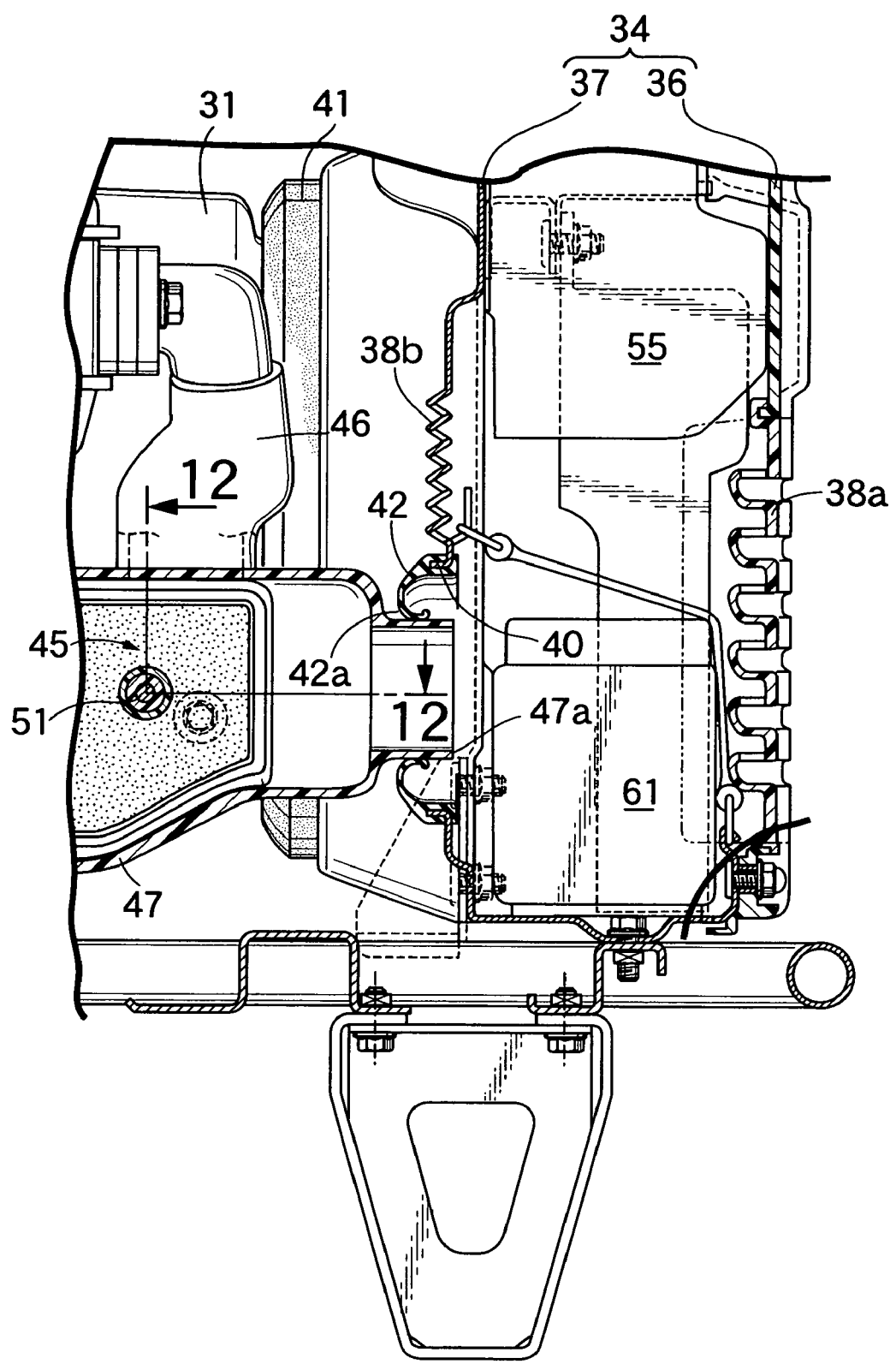
FIG. 11 is a sectional view along line 11-11 in FIG. 3.

In FIG. 9 to FIG. 11, the duct member 31 is disposed on the outer periphery of the engine 3 and the generator 4, the duct member 31 defining a series of cooling air passages 32 between itself and the engine 3 and generator 4 while surrounding a cooling fan 26, and in the cooling air passages 32 cooling air flows from the upstream end on the cooling fan 26 side to the downstream end on the engine 3 rear face side accompanying rotation of the cooling fan 26. In order to make production easy, the duct member 31 is segmented into a plurality of sections, and appropriate positions thereof are joined by bolting to an outer peripheral face of the engine 3.

As shown in FIG. 3 and FIG. 9, the engine 3 is of a 4-cycle type, a crankshaft 17 is disposed along the fore-and-aft direction of the engine-driven generator 1, a cylinder part 19 thereof projects obliquely upward to one side from a crankcase 18 housing and supporting the crankshaft 17, and an intake port and an exhaust port open on a front face and a rear face respectively of the cylinder part 19.

The generator 4 is formed from a stator 22 that is secured to a front end face of the crankcase 18 via a plurality of bolts 21 and includes a plurality of stator coils 22a, and an outer rotor 23 that is secured to a front end part of the crankshaft 17 running through a front end wall of the crankcase 18 and extending forward and that has a plurality of permanent magnets 23a arranged and fixedly provided on an inner peripheral face, that is, the generator is an outer rotor type multi-pole magnet generator. The outer rotor 23 includes a hub 23b surrounded by the stator 22, and this hub 23b is taper-fitted onto an end part of the crankshaft 17 and secured to the end part of the crankshaft 17 via a key 24 and a nut 25. In this way, the outer rotor 23 is cantilever-supported on the crankshaft 17.

Mounted on an outer end face of the outer rotor 23 are a centrifugal type cooling fan 26 having a diameter that is larger than that of the outer rotor 23 and corresponds to the inner diameter of the duct member 31, and a recoil type starter 27 projecting forward of the cooling fan 26.

As shown in FIG. 6 and FIG. 9, a ring gear 28 is secured to a rear end part of the crankshaft 17, and a starter motor 30 driving the ring gear 28 via a pinion 29 and an overrunning clutch (not illustrated) is mounted on an upper part of the crankcase 18.

In FIG. 1 to 5 and FIG. 8 to FIG. 11, disposed in a front part of the frame 2 is a rectangular intake box 34 for shaping the contours of a front face of the engine-driven generator 4 when viewed from the front. This intake box 34 is formed from a synthetic resin box main body 36 having an open rear face, and an end plate 37 made of a steel plate joined to the box main body 36 so as to close the open rear face. The end plate 37 is detachably secured via a plurality of bolts 35 to the brackets 12 and 13 as a reinforcing member for the frame 2, and the box main body 36 is detachably joined by bolting to the end plate 37.

As hereinbefore described, since the frame 2 is formed by making, using one steel pipe, the U-shaped base frame 2a and the pair of left and right side frames 2b sharing the left and right side sections of the base frame 2a to form a U-shape and by joining the two side frames 2b via the plurality of cross members 7, 8, and 8', the structure of the frame 2 is extremely simple and, moreover, since the frame 2 is reinforced by the intake box 34 detachably connected to its open front end part, the weight of the frame 2 can be reduced.

Dismantling the intake box 34 from the frame 2 enables the engine 3 and the generator 4 to be detached through the opened front side of the frame 2, thus making the maintenance thereof easy.

A first intake louver 38a is provided on the front face of the box main body 36; moreover, the end plate 37 is provided with a second intake louver 38b, a large diameter first connection opening 39 adjacent to the upstream end of the duct member 31, and a small diameter second connection opening 40, the peripheral edge of the first connection opening 39 is equipped with an annular first seal 41 made of an elastic material such as rubber, and a highly flexible annular seal lip 41a of the first seal 41 is fitted in an airtight manner around the outer periphery of the duct member 31. This first seal 41 links the intake box 34 and the duct member 31 while allowing relative displacement between the duct member 31 and the intake box 34 by virtue of elastic deformation of the seal lip 41a. An upstream end part of the duct member 31 is formed from a starter cover 31a, which will be described later, so as to project within the intake box 34, and an end wall and a peripheral wall of the starter cover 31a are provided with a large number of vents 116a and 116b (see FIG. 20). The intake box 34 has a cross-sectional area that is larger than the total aperture area of the vents 116a and 116b, thus forming a muffler expansion chamber.

Figure 20:
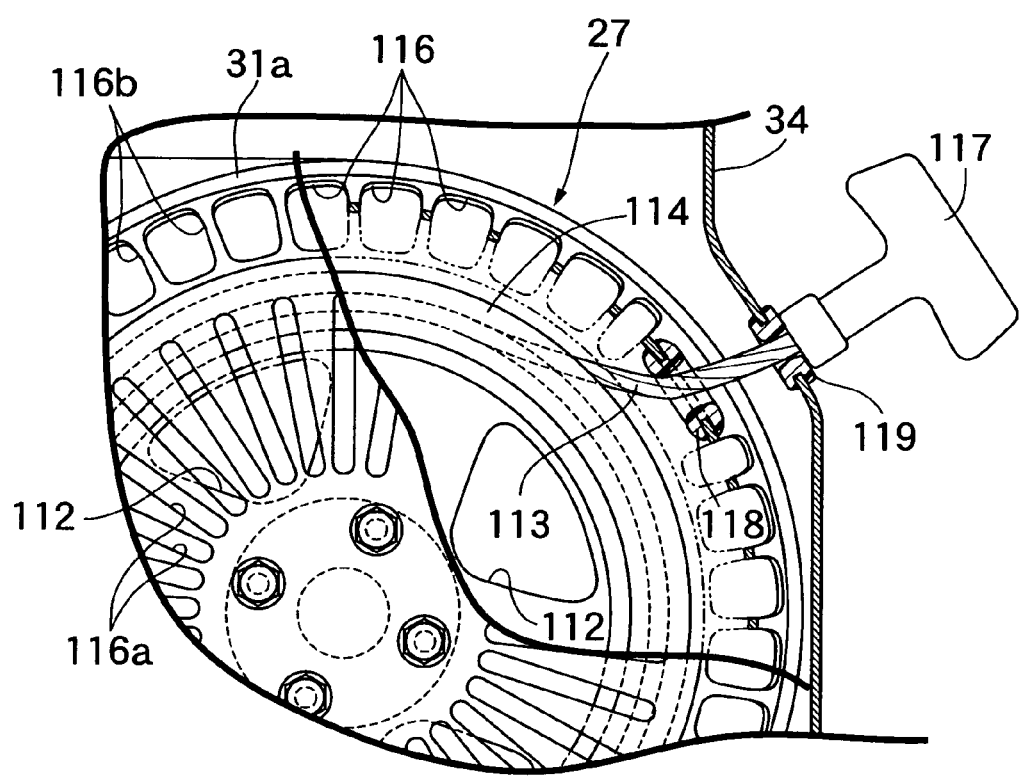
FIG. 20 is a sectional view along line 20-20 in FIG. 9.

In FIG. 9 and FIG. 20, the recoil type starter 27 includes a cup-shaped driven member 111, the starter cover 31a, which is bowl-shaped, a rope pulley 114, and a one-way clutch 115, the driven member 111 being secured to the outer end face of the outer rotor 23, the starter cover 31a being joined to the upstream end of the duct member 31 so as to cover it, the rope pulley 114 being axially and rotatably supported on an inner wall of the starter cover 31a and having a starter rope 113 wound therearound, the one-way clutch 115 being provided between the rope pulley 114 and the driven member 111 and only providing a connection between the rope pulley 114 and the driven member 111 when the rope pulley 114 is rotated forward by being pulled by the starter rope 113, and the rope pulley 114 being urged in a backward direction by a return spring (not illustrated). A large number of vents 112 are formed in the rope pulley 114 so that the rope pulley 114 does not interfere with the flow of cooling air within the duct member 31.

The starter rope 113 is taken outside the intake box 34 through grommet-shaped rope guides 118 and 119 provided on side walls of the starter cover 31a and the intake box 34 respectively, and the outer end of the starter rope 113 is connected to an operating knob 117. This operating knob 117 is supported on the outer end of the rope guide 119, which is on the outer side, when it is at a retracted position.

In this way, since an outer portion of the intake box 34 where the operating knob 117 of the recoil type starter 27 is disposed corresponds to substantially the outermost portion of the engine-driven generator 1, the operating knob 117 can easily be pulled without interfering with another object, and the starting operability is good.

In FIG. 1 and FIG. 10 to FIG. 12, a carburetor 44 is mounted on a front face of the cylinder part 19 of the engine 3. This carburetor 44 runs through a side wall of the duct member 31 and is exposed outside the duct member 31, and an air cleaner 45 similarly disposed outside the duct member 31 is connected to an intake passage entrance of the carburetor 44 via an elastic communicating tube 46 made of an elastic material such as rubber. Furthermore, a high tension cord 43 connected to a spark plug of the engine 3 runs through the side wall of the duct member 31 and is taken outside.

As shown in FIG. 1, the air cleaner 45 has a substantially rectangular shape that is long in the axial direction of the crankshaft 17 of the engine 3 when viewed from the side, and is disposed so that at least part of the air cleaner 45 is beneath the cylinder part 19, which is inclined slightly upward on one side of the crankcase 18. By so doing, it becomes possible to arrange the relatively large capacity air cleaner 45 while lowering the center of gravity of the engine-driven generator 1.

Figure 12:
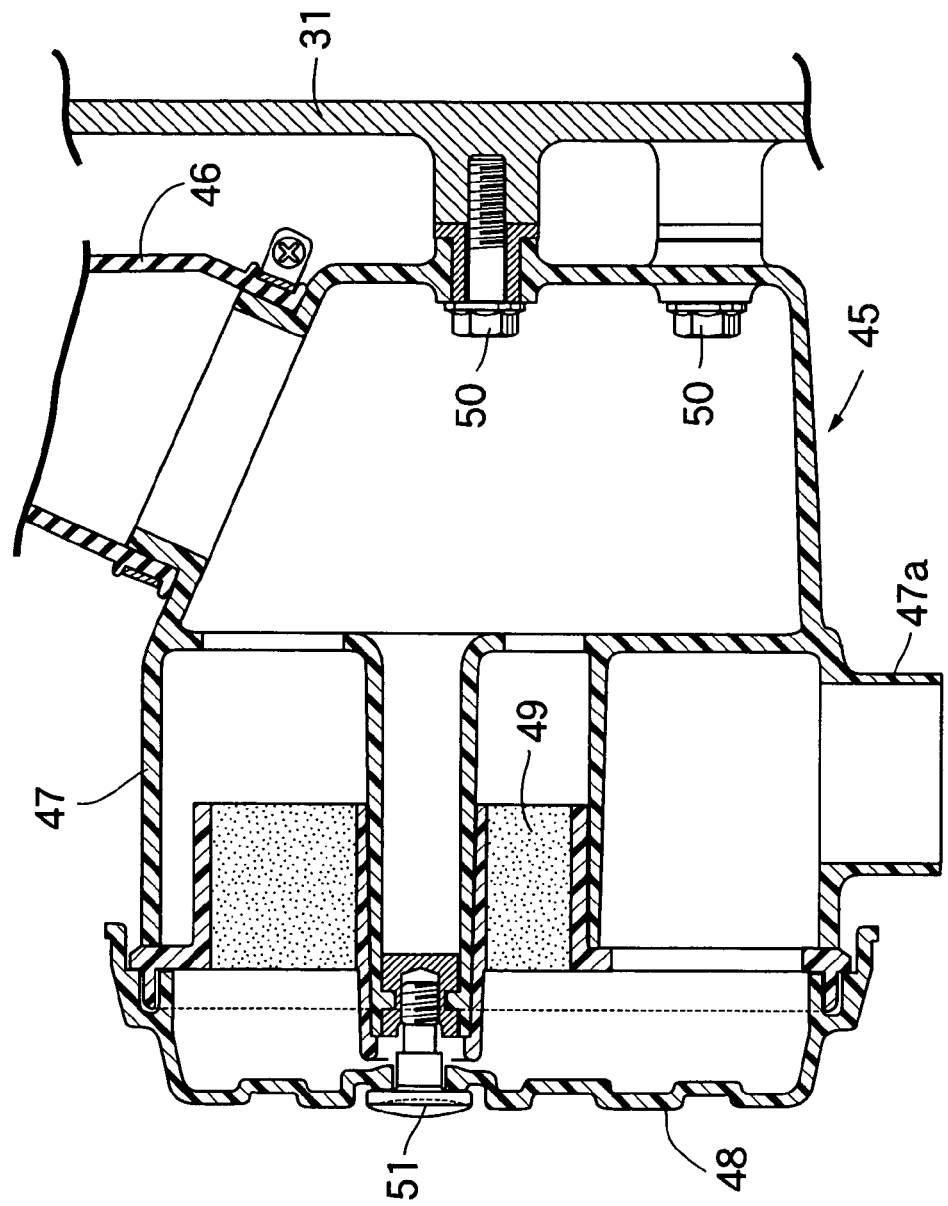
FIG. 12 is a sectional view along line 12-12 in FIG. 11.

As clearly shown in FIG. 11 and FIG. 12, this air cleaner 45 is formed from a cleaner case 47, a case cover 48, and a cleaner element 49, the cleaner case 47 being secured by a bolt 50 to an outer face of the duct member 31 and having an open outer face, the case cover 48 being joined to the cleaner case 47 by a bolt 51 so as to close the open face of the cleaner case 47, and the cleaner element 49 being held between the cleaner case 47 and the case cover 48. The cleaner case 47 has an integral air inlet pipe 47a communicating with the uncleaned side of the cleaner element 49.

The peripheral edge of the second connection opening 40 is equipped with an annular second seal 42 made of an elastic material such as rubber, and a highly flexible annular seal lip 42a of the second seal 42 is fitted around the outer periphery of the 47a of the air cleaner 45. This second seal 42 links the duct member 31 resiliently supported on the frame 2 via the engine 3 and the intake box 34 fixedly supported on the frame 2 while allowing relative displacement between the intake box 34 and the air cleaner 45 by virtue of elastic deformation of the seal lip 42a.

Figure 5:
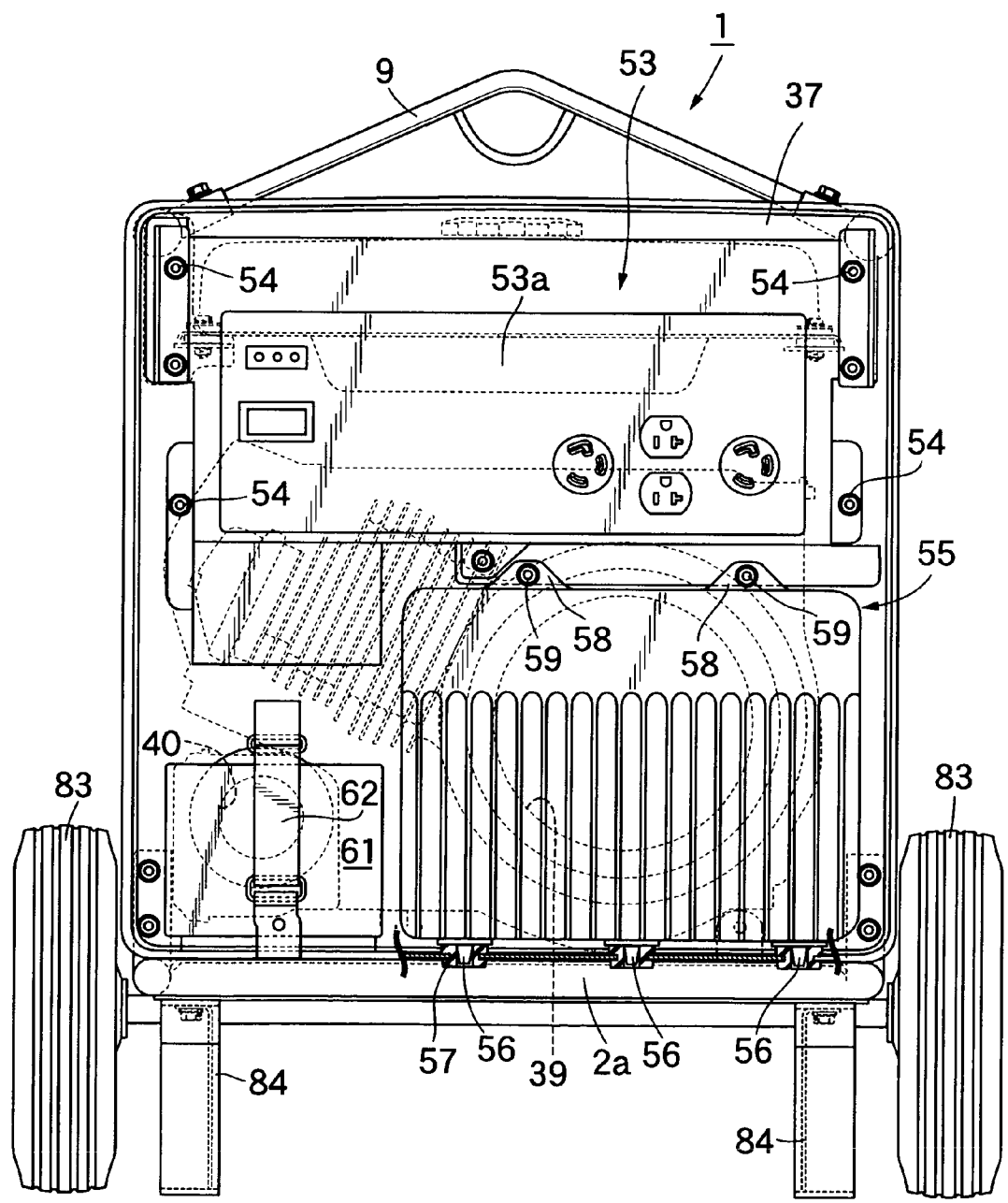
FIG. 5 is a front view of the engine-driven generator in a state in which a box main body of an intake box is detached.

In FIG. 3, FIG. 5 and FIG. 9, an access window 52 is provided on an upper part of a front face of the intake box 34, and an operation panel 53a of a control unit 53 for the engine 3 and the generator 4, which is disposed above the first connection opening 39 within the intake box 34, faces the access window 52. The control panel 53a is secured to an inner face of a rear wall of the intake box 34 via a bolt 54.

Within the intake box 34, the control unit 53 and an inverter 55 are disposed between the first intake louver 38a and the first connection opening 39, and a battery 61 is disposed between the first intake louver 38a and the second connection opening 40. In particular, the upstream end part of the duct member 31, which is disposed so as to project from the first connection opening 39 into the intake box 34, that is, the starter cover 31a, is disposed in proximity to a back face of the inverter 55.

The inverter 55 (see FIG. 5 in particular) is mounted on the intake box 34 by supporting a plurality of support shafts 56 projectingly provided on a lower end face of the inverter 55 on a base wall of the intake box 34 via grommets 57, and joining a plurality of ear pieces 58 at the upper end of the inverter 55 to the end plate 37 of the intake box 34 via bolts 59. In this arrangement, a sufficient ventilation gap is provided around the inverter 55 so as not to prevent air from flowing from the first and second intake louvers 38a and 38b to the first and second connection openings 39 and 40.

The battery 61 is retained on the end plate 37 by a rubber band 62. In this arrangement, a sufficient ventilation gap is provided around the battery 61 so as not to prevent air from flowing from the first and second intake louvers 38a and 38b to the second connection opening 40. For inspection of the battery 61, an inspection window 64 (see FIG. 8) that can be closed by a lid 63 is provided on a front wall of the intake box 34.

As clearly shown in FIG. 9, a mounting flange 67 is formed at the downstream end of the duct member 31, and an exhaust box 68 is mounted on the mounting flange 67. The exhaust box 68 is formed from a box main body 68 and an end plate 70, the box main body 68 having an exhaust louver 73 in an upper part of its rear face and having an open front face, the end plate 70 being joined to a flange part 68a of the box main body 69 so as to close the open face thereof, and the end plate 70 and the flange part 68a being secured to the mounting flange 67 via a plurality of bolts 71. Large and small through holes 72 and 75 (see FIG. 7) are bored in the end plate 70 of the exhaust box 68, and the downstream end of the duct member 31 communicates with the interior of the exhaust box 68 via these through holes 72 and 75. This exhaust box 68 has a cross-sectional area that is sufficiently larger than the aperture area of the through holes 72 and 75, thus forming a muffler expansion chamber.

This exhaust box 68 houses an exhaust muffler 74 and an outlet pipe 74a thereof, the exhaust muffler 74 being mounted on a rear face of the cylinder part 19 of the engine 3, and the end of the outlet pipe 74a opens at a long distance from the exhaust louver 73 of the exhaust box 68. A sufficient ventilation gap is provided around the exhaust muffler 74 so as to allow cooling air to flow from each of the through holes 72 and 75 to the exhaust louver 73.

As shown in FIG. 1, FIG. 7, FIG. 9, FIG. 13, and FIG. 14, the fuel tank 5, which includes a fuel filler hole cap 5a on an upper wall, is disposed above the duct member 31 covering the engine 3 and the generator 4. This fuel tank 5 has a substantially square shape when viewed from above and covers the whole length of an upper face of the duct member 31, and four corners of a mounting flange 77 projectingly provided on the outer periphery of the fuel tank 5 are detachably mounted, together with elastic members 78 and 78' disposed above and beneath the corners, on the upper cross member 8' and the bracket pieces 16 of the frame 2 via bolts 79. In this way, the fuel tank 5 is resiliently supported on the frame 2.

Figure 13:
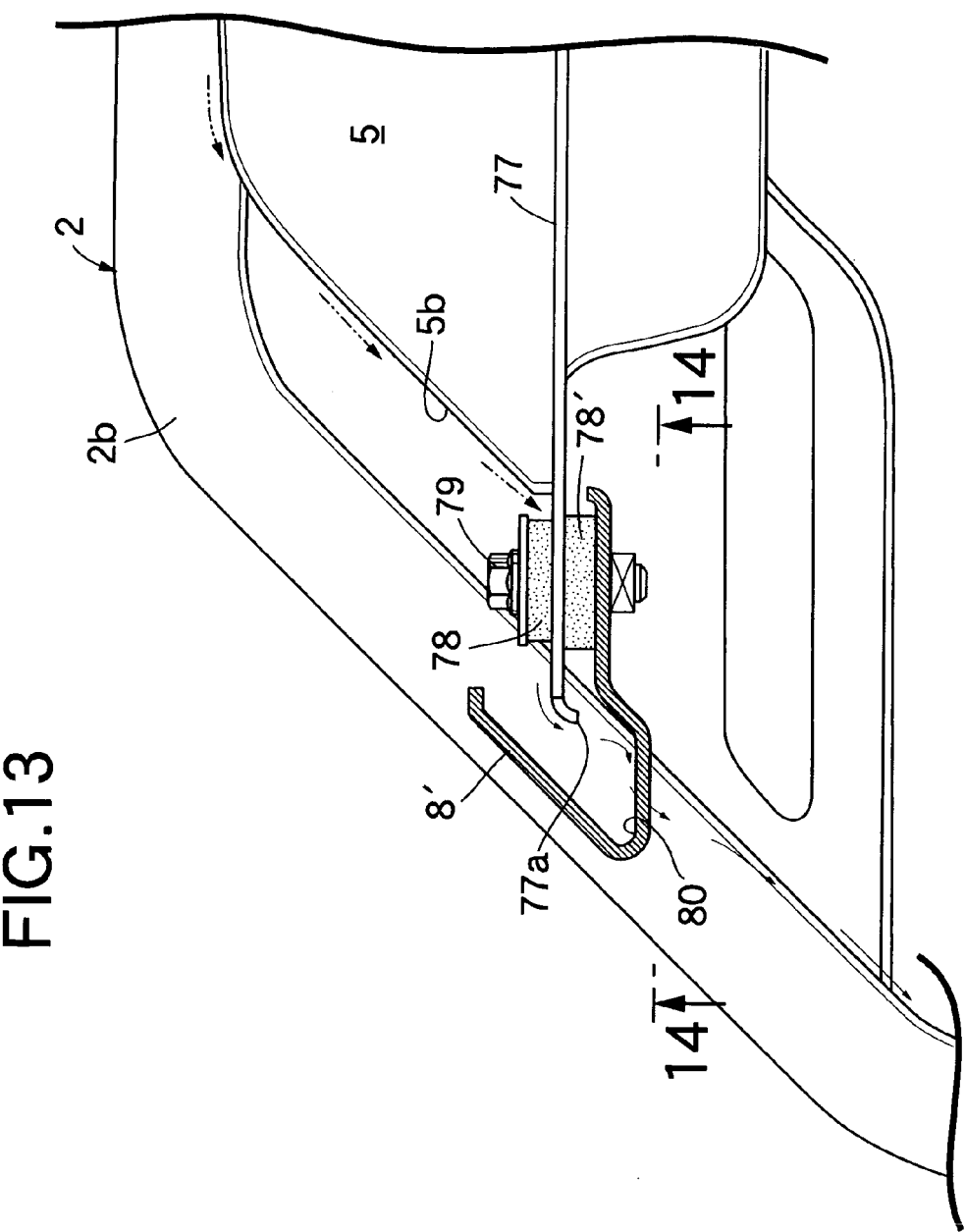
FIG. 13 is a sectional view along line 13-13 in FIG. 2.
Figure 14:
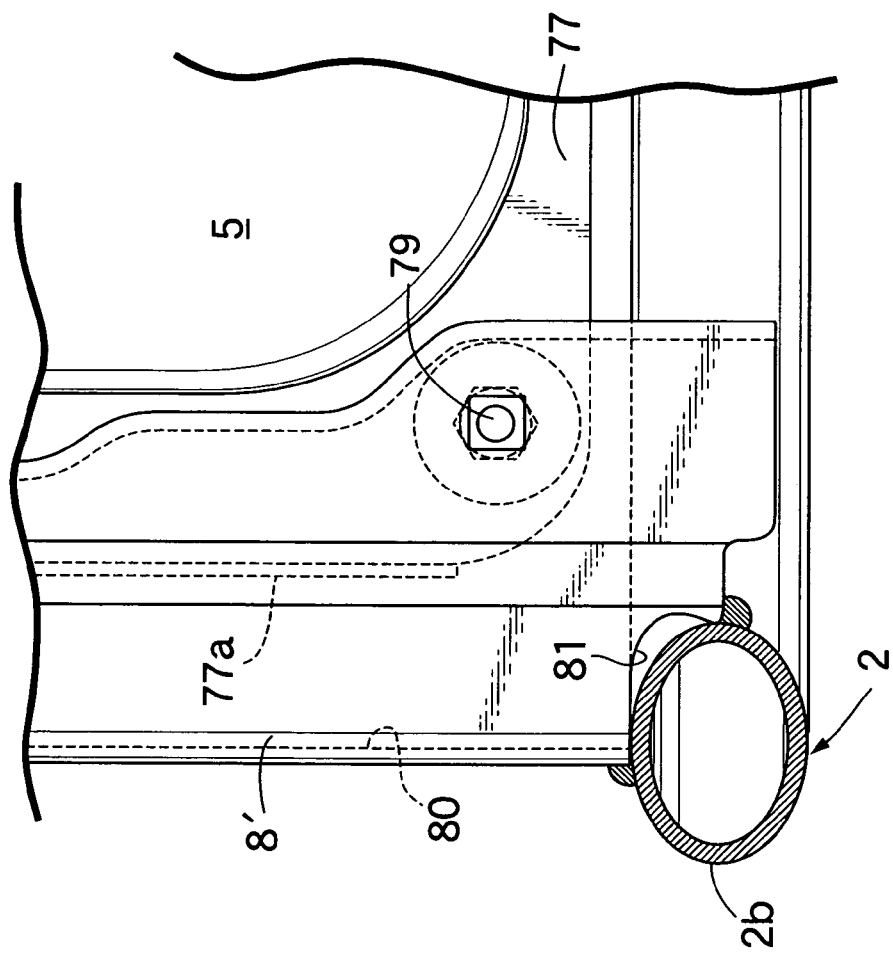
FIG. 14 is a sectional view along line 14-14 in FIG. 13.
Figure 15:
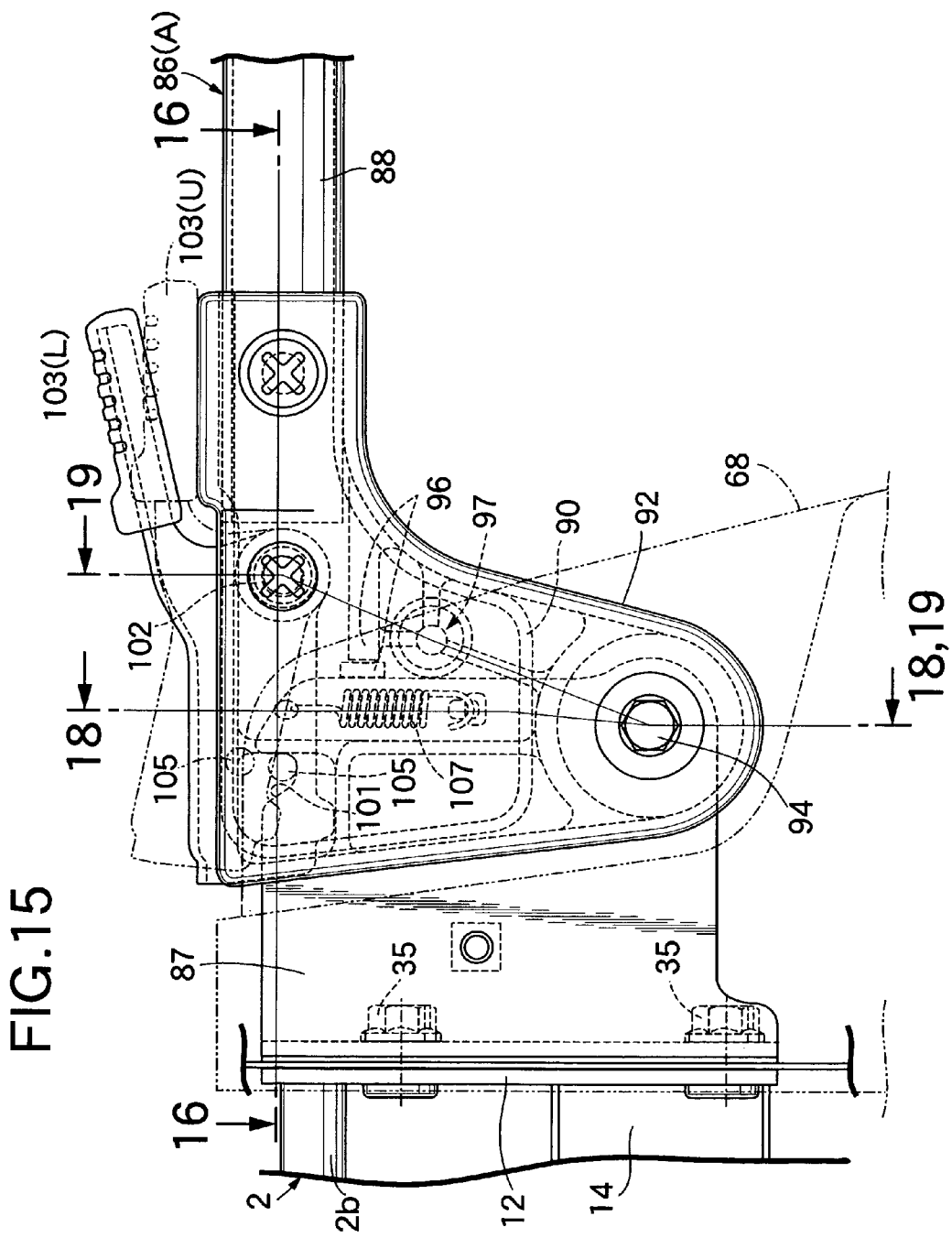
FIG. 15 is an enlarged view of the moving handle part of FIG. 1.
Figure 16:
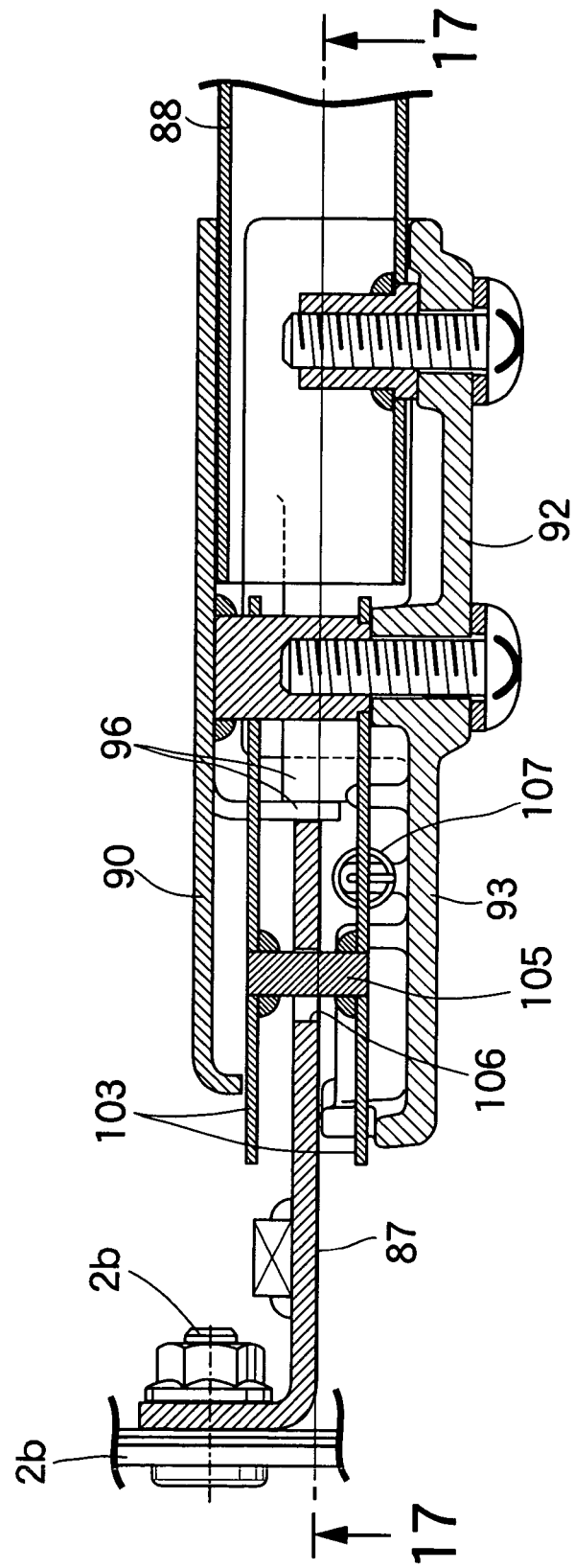
FIG. 16 is a sectional view along line 16-16 in FIG. 15.
Figure 17:
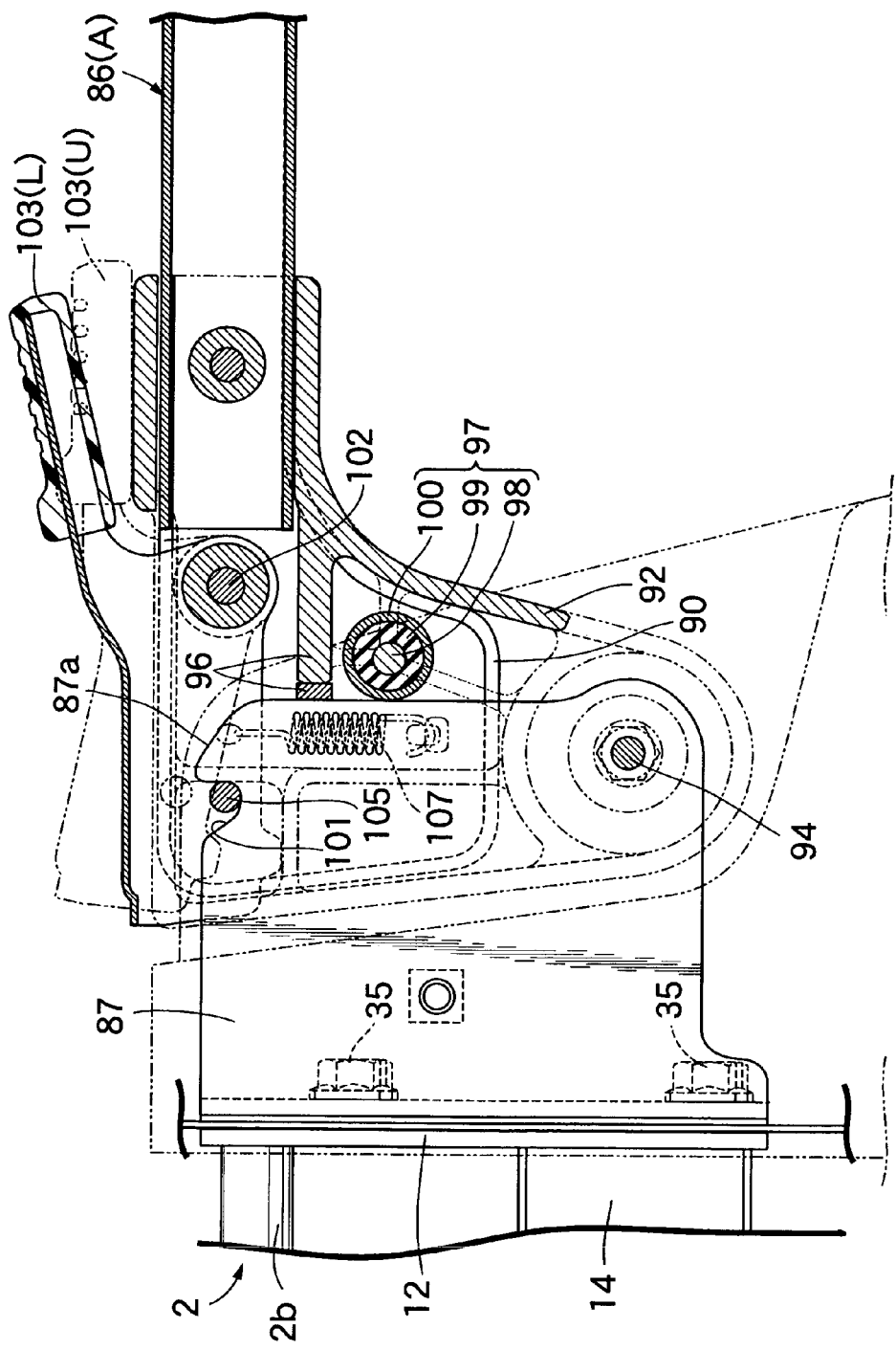
FIG. 17 is a sectional view along line 17-17 in FIG. 16.
Figure 18:
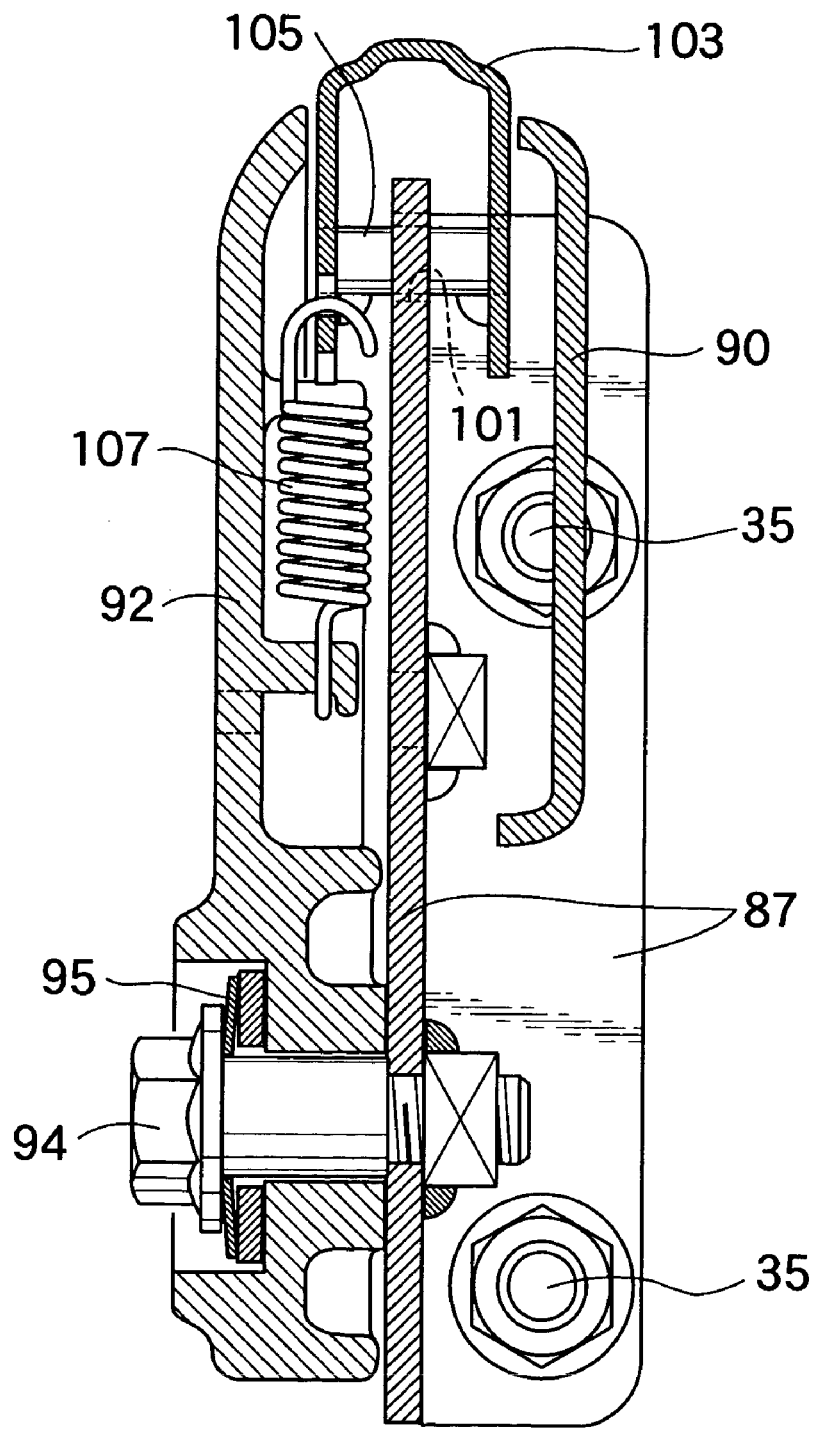
FIG. 18 is a sectional view along line 18-18 in FIG. 15.
Figure 19:
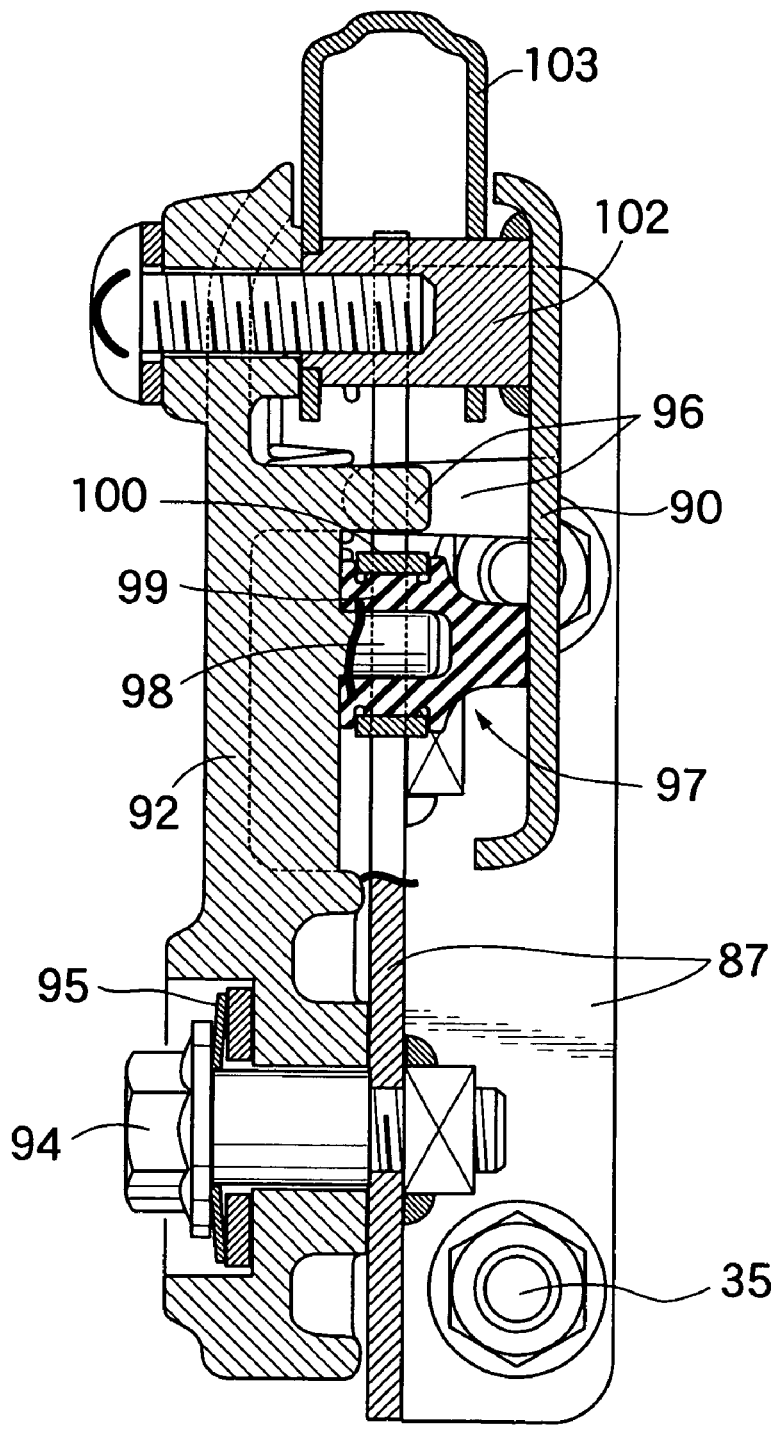
FIG. 19 is a sectional view along line 19-19 in FIG. 15.

In FIG. 13 and FIG. 14 in particular, a gutter 80 is formed on the upper cross member 8' of the frame 2 supporting a rear end part of the mounting flange 77 of the fuel tank 5, a downwardly bent edge 77a of the mounting flange 77 facing the gutter 80, and opposite ends of the gutter 80 communicating with outer peripheral faces of the vertical side sections of the left and right side frames 2b via an outflow hole 81. The outflow hole 81 is formed as a cutout in a part of the cross member 8' where it is welded to the left and right side frames 2b. Furthermore, formed on an upper face of the fuel tank 5 is an inclined face 5b that slopes down toward the gutter 80 and extends to the mounting flange 77.

When filling the fuel tank 5 with fuel, even if fuel overflowing onto the upper face of the fuel tank 5 via the fuel filler hole flows rearward, the fuel flows down the inclined face 5b, reaches the mounting flange 77, is guided by the downwardly bent edge 77a of the flange 77, reliably flows into the gutter 80, flows along the gutter 80, flows down from either one of the left and right outflow holes 81 along the outer peripheral face of the vertical side section of the corresponding one of the left and right side frames 2b, and drops outside the machine.

Therefore, as in the illustrated example, even when the engine 3, the generator 4, or auxiliary equipment therefore, such as the exhaust box 68, is disposed beneath the gutter 80, since the overflowing fuel will not contaminate it, the degree of freedom in the layout can be increased outstandingly.

Furthermore, since the gutter 80 is formed by utilizing the cross member 8', which is a reinforcing member of the frame 2, the structure can be simplified and, moreover, since the outflow hole 81 is formed as a cutout at opposite ends of the cross member 8', any degradation in the strength of the frame 2 can be avoided.

The duct member 31, the exhaust box 68, and the fuel tank 5 are disposed within the open type frame 2.

When the engine 3 is running, electricity is generated by driving the generator 4 by means of the rotating crankshaft 17, and the output is controlled by the inverter 55 and the control unit 53 and then taken out via a receptacle on the operation panel 53a.

Furthermore, the cooling fan 26, which is pivoted by the crankshaft 17, takes outside air as cooling air into the intake box 34 through the first and second intake louvers 38a and 38b, and makes it flow within the duct member 31 from the upstream end to the downstream end and through the exhaust box 68, and discharges it to the outside via the exhaust louver 73. Due to such a flow of cooling air, the control unit 53 and the inverter 55 are cooled within the intake box 34, the engine 3 and the generator 4 are cooled within the duct member 31, and the exhaust muffler 74 is cooled within the exhaust box 68.

In particular, since the upstream end part of the duct member 31, that is, the starter cover 31a having the vents 116a and 116b, is disposed in proximity to the back face of the inverter 55 within the intake box 34, air around the inverter 55 is taken into the duct member 31 effectively, and the inverter 55, which easily attains a relatively high temperature, can be cooled effectively.

Furthermore, exhaust gas discharged from the outlet pipe 74a of the exhaust muffler 74 is mixed with the cooling air within the exhaust box 68, thus lowering the exhaust temperature, and at the same time the exhaust noise can be reduced effectively.

Moreover, the cooling fan 26, which has a large diameter corresponding to the inner diameter of the duct member 31, can be simply mounted by utilizing the large outer end face of the outer rotor 23, which is cantilever-supported on the crankshaft 17, and the effect of cooling the engine 3 and the generator 4 can be enhanced.

While the engine 3 and the generator 4 are running, the operating noise generated by these and the cooling fan 26 is blocked by the duct member 31. That is, the duct member 31 plays a role as a soundproofing wall for the engine 3, the generator 4, and the cooling fan 26. Furthermore, even if the operating noise is transmitted from the upstream end and the downstream end of the duct member 31 to the intake box 34 and the exhaust box 68, by virtue of the expansion muffler effect of the intake box 34 and the exhaust box 68 the operating noise can be muffled effectively, and it is possible to prevent as much as possible the operating noise from leaking outside. In particular, with regard to the intake box 34, since the control unit 53 and the inverter 55 are disposed between the first connection opening 39 and the first intake louver 38a, the control unit 53 and the inverter 55 become soundproofing partitions between the first connection opening 39 and the first intake louver 38a, thus preventing the noise from leaking outside and thereby enhancing the muffling effect of the intake box 34. In this way, the quietness of the engine-driven generator 1 can be ensured.

Moreover, the fuel tank 5 covers the whole length of the upper face of the duct member 31, thus forming, in cooperation with the duct member 31, a double soundproofing wall for the engine 3 and the generator 4, and it is therefore possible to prevent effectively the operating noise of the engine 3 and the generator 4 from leaking upward, thus further enhancing the quietness of the engine-driven generator 1 by a simple structure.

Moreover, since the relatively large fuel tank 5 is mounted in the upper part of the left and right side frames 2b as described above, it is easy to mount and demount the fuel tank 5, and since it is detachable relative to the frame 2 in the same manner as the intake box 34, demounting the fuel tank 5 and the intake box 34 makes the upper face and the front face of the frame 2 open and enables the engine 3 and the generator 4 to be easily detached, thus enhancing the ease of maintenance.

Furthermore, during an intake stroke of the engine 3, since air within the intake box 34 is taken into the engine 3 via the air cleaner 45 and the carburetor 44, intake noise of the engine 3 can also be muffled effectively by the intake box 34. In particular, the battery 61 within the intake box 34 becomes a soundproofing partition between the second connection opening 40 and the first intake louver 38a, thus preventing the intake noise from leaking outside and thereby further enhancing the muffling effect of the intake box 34.

In this way, the operating noise of the engine 3, the generator 4, and the cooling fan 26, etc. can be reduced simply and reliably by the duct member 31 covering the engine 3 and the generator 4, and by the intake and exhaust boxes 34 and 68 connected to the upstream and downstream ends of the duct member 31 and, moreover, since the duct member 31 and the intake and exhaust boxes 34 and 68 are disposed within the open type frame 2, compared with a conventional arrangement in which an entire engine-driven generator is covered by a soundproofing wall, the engine-driven generator 1 can be made compact and lightweight. Moreover, since the carburetor 44 and the air cleaner 45 are disposed outside the duct member 31, maintenance operations thereof can be carried out easily and quickly.

Vibration occurring when such an engine 3 is running is absorbed by elastic deformation of the elastic members 11 disposed between the engine 3 and the frame 2, thus preventing the vibration from being transmitted to the frame 2 or greatly reducing it.

Since the duct member 31 and the air cleaner 45 are fixed to the engine 3, they vibrate together with the engine 3, but since the intake box 34 is fixed to the frame 2, when the engine 3 and the generator 4 are running, a relative displacement occurs between the duct member 31 and air cleaner 45 and the intake box 34 due to the vibration of the engine 3. However, since the first and second connection openings 39 and 40 of the intake box 34 are connected to the duct member 31 and the air cleaner 45 via the highly flexible first and second seals 41 and 42, the relative displacement, accompanying the vibration, between the duct member 31 and air cleaner 45 and the intake box 34 is allowed by virtue of flexure of the first and second seals 41 and 42, and it is therefore possible for cooling air to efficiently flow from the intake box 34 to the duct member 31 without leaking.

As shown in FIG. 3 and FIG. 9, a pair of left and right wheels 83 are axially supported on the base frame 2a of the frame 2 on the rear side, that is, on the exhaust box 68 side, and a pair of left and right grounding legs 84 are fixedly provided on the base frame 2a of the frame 2 on the front side, that is, the intake box 34 side.

In FIG. 1 and FIG. 15 to FIG. 19, a pair of left and right handle brackets 87 are secured via bolts 35 to upper brackets 12 at the front end of the frame 2 together with the end plate 37 of the intake box 34; these handle brackets 87 project outside through a pair of left and right slits 76 (see FIG. 8) provided in the box main body 36 of the intake box 34, and a moving handle 86 is attached to these projecting parts, the moving handle 86 being used when the engine-driven generator 1 is moved. This moving handle 86 is formed from a pair of left and right handle bars 88, a cross member 89 providing a connection between middle parts of these handle bars 88, an L-shaped base plate 92 joined by bolts to each of the handle bars 88 and a connecting plate 90 welded to the base of the handle bars 88, and a rubber handle grip 93 fitted onto the extremity of the handle bars 88. The left and right base plates 92 are connected to the left and right handle brackets 87 via horizontal pivot bolts 94, and the moving handle 86 can pivot between a working position A at which the two handle bars 88 are horizontal and a storage position B at which the handle grips 93 are directed vertically downward. A dish spring 95 is disposed between a head part of the pivot bolt 94 and the base plate 92, the dish spring 95 imparting an appropriate pivoting resistance to the moving handle 86.

The working position A of the moving handle 86 is defined by a stopper 96 formed on the connecting plate 90 and the base plate 92 abutting against an extremity face of the handle bracket 87, and the storage position B is defined by the handle grip 93 abutting against a front side section of the base frame 2a of the frame 2 protruding forward of the intake box 34.

A damper 97 is provided on the base plate 92, the damper 97 operating immediately before the stopper 96 abuts against the handle bracket 87 when the moving handle 86 is pivoted from the storage position B to the working position A. That is, the damper 97 is formed from a support shaft 98 projectingly provided integrally with an inner wall of the base plate 92, a cushion member 99 made of rubber fitted around the outer periphery of the support shaft 98, and a bush 100 fitted around the outer periphery of the cushion member 99, and the pivoting impact of the moving handle 86 is absorbed by elastic deformation of the cushion member 99 as a result of the bush 100 abutting against the handle bracket 87 immediately before the stopper 96 abuts against the tip face of the bracket 87.

Furthermore, a lock mechanism 101 for locking the moving handle 86 at the working position A is provided on the moving handle 86 and the handle bracket 87. This lock mechanism 101 is provided with operating levers 103 that are supported by pivot shafts 102 fixedly provided between the left and right connecting plates 90 and the base plates 92 and can pivot between a locked position L and an unlocked position U. A lock pin 105 and a lock groove 106 are provided on each of the operating levers 103 and an upper edge part of the handle bracket 87 respectively, and the lock pin 105 engages with and disengages from the lock groove 106 accompanying pivoting of the operating lever 103 between the locked position L and the unlocked position U when the moving handle 86 is at the working position A. A lock spring 107 is provided in a compressed state between the operating lever 103 and the base plate 92, the lock spring 107 urging the operating lever 103 in the locked position L direction. Furthermore, an arc face 87a is formed on the handle bracket 87 from the tip face to the upper edge part, the arc face 87a guiding the lock pin 105 so that it engages with the lock groove 106.

When the moving handle 86 is pivoted around the pivot bolt 94 from the storage position B to the working position A and the lock pin 105 arrives at the lock groove 106 while being guided by the arc face 87a, the operating lever 103 is pivoted to the locked position L by virtue of the urging force of the lock spring 107 and the lock pin 105 engages with the lock groove 106. In this way, the moving handle 86 is locked at the horizontal working position A.

In a state in which the left and right grips 93 of the moving handle 86 are held and pulled upward so as to lift the grounding legs 84 off the ground, by pushing or pulling the moving handle 86 the engine-driven generator 1 can be moved lightly by virtue of rotation of the wheels 83.

Even if a hand is detached from the moving handle 86 during use thereof, since the handle 86 remains locked by the lock mechanism 101, it is possible to prevent the handle 86 from pivoting to the storage position B due to its own weight, thus achieving good operability for the handle 86.

Furthermore, when the moving handle 86 is pivoted to the working position A, since the cushion member 99 of the damper 97 abuts against the handle bracket 87 via the bush 100 and elastically deforms immediately before the stopper 96 abuts against the handle bracket 87, a pivoting impact of the moving handle 86 can be absorbed and, moreover, since the elastic deformation of the cushion member 99 is maintained after the handle 86 is locked at the working position A by the lock mechanism 101, its resilient force can prevent the lock mechanism 101 from rattling. Furthermore, since direct contact of the cushion member 99 with the handle bracket 87 is avoided by the bush 100 covering the outer periphery of the cushion member 99, the durability thereof can be enhanced.

After movement thereof, by pivoting the operating lever 103 to the unlocked position U against the urging force of the lock spring 107 so as to disengage the lock pin 105 from the lock groove 106, the moving handle 86 can freely pivot around the pivot bolt 94. Therefore, the handle 86 can be pivoted to the storage position B, in which it is in a vertical attitude.

In this process, since the left and right handle grips 93 of the moving handle 86 abut against the base frame 2a of the frame 2, the left and right handle bars 88 and the cross member 89 are disposed on the front face of the intake box 34, thus playing a role as a strong bumper for protecting the intake box 34, as well as the control unit 53, the inverter 55, and the battery 61, from contact with another object.

Furthermore, in a state in which the moving handle 86 is folded at the storage position B as described above, work using the engine-driven generator 1 can easily be carried out without interfering with the moving handle 86 and, furthermore, when the engine-driven generator 1 is stored in a warehouse, etc., a relatively small space is sufficient for storage.

Moreover, since the handle 86 functions as a bumper, the intake box 34 can be protected effectively by means of the moving handle 86 pivoted to the storage position and the base frame 2a of the frame 2 without providing a special guard frame on the intake box 34, and it is therefore possible to make the box main body 36 of the large intake box 34 housing the control unit 53, the inverter 55, and the battery 61 of a synthetic resin, thus reducing the weight thereof.

The present invention is not limited to the above-mentioned embodiment, and can be modified in a variety of ways as long as it does not depart from the spirit and scope thereof.

For example, the air cleaner 45 may also be fixedly supported on the frame 2 in the same manner as for the intake box 34, relative displacement between the carburetor 44 and the air cleaner 45 accompanying vibration of the engine 3 being absorbed by flexure of the elastic communicating tube 46 providing communication between the carburetor 44 and the air cleaner 45, and in this case the air inlet pipe 47a of the air cleaner 45 can be connected integrally to the intake box 34.

Furthermore, the outlet pipe of the exhaust muffler 74 may be opened to the outside by making it run through an outer wall of the exhaust box 68 as shown by the reference numeral 74a' in FIG. 9. In this case, only cooling air is discharged from the exhaust louver 73 of the exhaust box 68.

The invention claimed is:

1. An engine-driven work machine comprising a frame formed from a base frame and a pair of left and right side frames sharing left and right side sections of the base frame, a wheel axially supported on the base frame so that the wheel can rotate in the fore-and-aft direction of the frame, equipment, including an engine and a work machine driven thereby, supported on the base frame, and a moving handle provided on an end part in the fore-and-aft direction of the frame, wherein the moving handle is formed from a pair of left and right handle bars having a handle grip at the extremity, and a cross member integrally connecting middle parts of the handle bars to each other, and the two handle bars are mounted in upper parts of the side frames so that the two handle bars can pivot between a working position (A) in which the two handle bars protrude from the frame and a storage position (B) in which, with the handle grip facing downward, the handle bars in cooperation with the cross member function as a bumper, and wherein the frame has an open mouth defined by the base frame and pair of left and right side frames at the end part in the fore-and-aft direction of the frame, the open mouth being closed when the handle bars are pivoted to the storage position.

2. The engine-driven work machine according to claim 1, wherein when the moving handle is in the storage position (B), an end part of the base frame protruding outward relative to the equipment abuts against the handle bars.

3. The engine-driven work machine according to either claim 1 or 2, wherein an electrical component for the engine and the work machine is mounted on the frame so that the electrical component is protected by the moving handle in the storage position (B).

4. The engine-driven work machine according to claim 2, wherein a control box is mounted on the base frame and end parts, in the fore-and-aft direction, of the two side frames so that the control box is protected by the moving handle in the storage position (B), the control box housing and holding an electrical component for the engine and the work machine.

5. The engine-driven work machine according to claim 1, wherein the moving handle is mounted on a handle bracket fixedly provided on an upper part of the frame so that the handle can pivot between the working position (A) in which the handle protrudes from the frame and the storage position (B) in which the handle grip faces downward, and a lock mechanism is provided between the handle bracket and the moving handle, the lock mechanism automatically locking the handle at the working position (A) when the handle is pivoted to the working position (A).

6. The engine-driven work machine according to claim 5, wherein the lock mechanism comprises an operating lever axially supported on the moving handle so as to pivot between a locked position (L) and an unlocked position (U), a latching member provided on the operating lever, a latching groove provided on the handle bracket, the latching member engaging with and disengaging from the latching groove accompanying the operating lever pivoting to the locked position (L) and the unlocked position (U), and a lock spring urging the operating lever in the locked position (L) direction.

7. The engine-driven work machine according to either claim 5 or 6, wherein a damper is provided between the handle bracket and the moving handle, the damper having a cushion member that undergoes elastic deformation between a point immediately before the handle reaches the working position (A) and a point when the handle reaches the working position (A).

8. The engine-driven work machine according to claim 7, wherein the damper is formed from the cushion member, which is mounted on one of the handle bracket and the moving handle, and a bush fitted around the outer periphery of the cushion member, the bush being pressed by the other one of the handle bracket and the moving handle to thus elastically deform the cushion member between a point immediately before the moving handle reaches the working position (A) and a point when the handle reaches the working position (A).

9. An engine-driven work machine comprising a frame formed from a base frame and a pair of left and right side frames sharing left and right side sections of the base frame, a wheel axially supported on the base frame so that the wheel can rotate in the fore-and-aft direction of the frame, equipment, including an engine and a work machine driven thereby, supported on the base frame, and a moving handle provided on an end part in the fore-and-aft direction of the frame, wherein the moving handle is formed from a pair of left and right handle bars having a handle grip at the extremity, and a cross member integrally connecting middle parts of the handle bars to each other, and the two handle bars are mounted in upper parts of the side frames so that the two handle bars can pivot between a working position (A) in which the two handle bars protrude from the frame and a storage position (B) in which, with the handle grip facing downward, the handle bars in cooperation with the cross member function as a bumper, and wherein the moving handle is mounted on a handle bracket fixedly provided on an upper part of the frame so that the handle can pivot between the working position (A) in which the handle protrudes from the frame and the storage position (B) in which the handle grip faces downward, and a lock mechanism is provided between the handle bracket and the moving handle, the lock mechanism automatically locking the handle at the working position (A) when the handle is pivoted to the working position (A).

10. The engine-driven work machine according to claim 9, wherein when the moving handle is in the storage position (B), an end part of the base frame protruding outward relative to the equipment abuts against the handle bars.

11. The engine-driven work machine according to claim 9, wherein an electrical component for the engine and the work machine is mounted on the frame so that the electrical component is protected by the moving handle in the storage position (B).

12. The engine-driven work machine according to claim 10, wherein a control box is mounted on the base frame and end parts, in the fore-and-aft direction, of the two side frames so that the control box is protected by the moving handle in the storage position (B), the control box housing and holding an electrical component for the engine and the work machine.

13. The engine-driven work machine according to claim 9, wherein the lock mechanism comprises an operating lever axially supported on the moving handle so as to pivot between a locked position (L) and an unlocked position (U), a latching member provided on the operating lever, a latching groove provided on the handle bracket, the latching member engaging with and disengaging from the latching groove accompanying the operating lever pivoting to the locked position (L) and the unlocked position (U), and a lock spring urging the operating lever in the locked position (L) direction.

14. The engine-driven work machine according to claim 13, wherein a damper is provided between the handle bracket and the moving handle, the damper having a cushion member that undergoes elastic deformation between a point immediately before the handle reaches the working position (A) and a point when the handle reaches the working position (A).

15. The engine-driven work machine according to claim 14, wherein the damper is formed from the cushion member, which is mounted on one of the handle bracket and the moving handle, and a bush fitted around the outer periphery of the cushion member, the bush being pressed by the other one of the handle bracket and the moving handle to thus elastically deform the cushion member between a point immediately before the moving handle reaches the working position (A) and a point when the handle reaches the working position (A).

* * * * *

UNITED STATES PATENT AND TRADEMARK OFFICE
CERTIFICATE OF CORRECTION

PATENT NO. : 7,597,340 B2
APPLICATION NO. : 10/562216
DATED : October 6, 2009
INVENTOR(S) : Hirose et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this

Twenty-eighth Day of September, 2010

David J. Kappos
*Director of the United States Patent and Trademark Office*